US012794786B2

(12) United States Patent
Balasubramanian et al.

(10) Patent No.: US 12,794,786 B2
(45) Date of Patent: Nov. 10, 2026

(54) HYBRID TRANSMISSION FOR FEDERATED LEARNING

(71) Applicant: QUALCOMM Incorporated, San Diego, CA (US)

(72) Inventors: Anantharaman Balasubramanian, San Diego, CA (US); Stelios Stefanatos, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 8 days.

(21) Appl. No.: 18/864,477

(22) PCT Filed: Jun. 1, 2023

(86) PCT No.: PCT/US2023/067763
§ 371 (c)(1),
(2) Date: Nov. 8, 2024

(87) PCT Pub. No.: WO2024/020260
PCT Pub. Date: Jan. 25, 2024

(65) Prior Publication Data

US 2025/0300902 A1 Sep. 25, 2025

(30) Foreign Application Priority Data

Jul. 20, 2022 (GR) ................................ 0220100577

(51) Int. Cl.
*H04L 41/16* (2022.01)
*G06N 3/084* (2023.01)
*G06N 20/00* (2019.01)

(52) U.S. Cl.
CPC ............ *H04L 41/16* (2013.01); *G06N 3/084* (2013.01); *G06N 20/00* (2019.01)

(58) Field of Classification Search
CPC ......... H04L 41/16; G06N 3/084; G06N 20/00
See application file for complete search history.

(56) References Cited

U.S. PATENT DOCUMENTS

2021/0143987 A1 5/2021 Xu et al.
2022/0124779 A1 4/2022 Pezeshki et al.
(Continued)

FOREIGN PATENT DOCUMENTS

WO 2022126307 A1 6/2022

OTHER PUBLICATIONS

International Search Report and Written Opinion—PCT/US2023/067763—ISA/EPO—Sep. 21, 2023.
(Continued)

*Primary Examiner* — Boris D Grijalva Lobos
(74) *Attorney, Agent, or Firm* — ArentFox Schiff LLP

(57) ABSTRACT

Example implementations include a method, apparatus and computer-readable medium of wireless communication at a user equipment (UE), comprising receiving one or more configurations indicating transmission of gradient information using mapping information and a transmission type, wherein the transmission type indicates an analog transmission or a digital transmission of the gradient information and the gradient information is associated with training a global machine learning model. The implementations further include generating a signal including quantized gradient information based on the mapping information and a set of gradients, wherein the set of gradients is associated with the training of the global machine learning model with local training data at the UE. Additionally, the implementations further include transmitting the signal to a network entity via the analog transmission or the digital transmission based on the transmission type.

24 Claims, 18 Drawing Sheets

(56) References Cited

U.S. PATENT DOCUMENTS

2023/0422308 A1 * 12/2023 Lee ........................ G06N 3/084
2025/0175393 A1 * 5/2025 Moosavi ............... H04W 28/16

OTHER PUBLICATIONS

Lin X., "Hybrid Distributed Stochastic Gradient Descent for Federated Learning", Jul. 31, 2020, 66 Pages, XP093081447, The Whole Document.

* cited by examiner

HYBRID TRANSMISSION FOR FEDERATED LEARNING

CROSS REFERENCE TO RELATED APPLICATION(S)

This application is a national stage application filed under 35 U.S.C. 371 based on International Patent Application No. PCT/US2023/067763, filed on Jun. 1, 2023, which claims the benefit of Greek patent application No. 20220100577, entitled "HYBRID TRANSMISSION FOR FEDERATED LEARNING" and filed on Jul. 20, 2022, both of which are assigned to the assignee hereof, and incorporated herein by reference in their entireties.

BACKGROUND

Technical Field

The present disclosure generally relates to communication systems, and more particularly, to transmission schemes for federated learning.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of wireless communication at a user equipment (UE), comprising receiving one or more configurations indicating transmission of gradient information using mapping information and a set of UE-specific resources or a set of common resources, wherein the gradient information is associated with training a global machine learning model. The method further includes generating a signal including quantized gradient information based on the mapping information and a set of gradients, wherein the set of gradients is associated with the training of the global machine learning model with local training data at the UE. Additionally, the method further includes transmitting the signal to a network entity using the set of UE-specific resources or the set of common resources.

Another example aspect includes an apparatus for wireless communication at a user equipment (UE), comprising a memory and a processor coupled with the memory. The processor is configured to receive one or more configurations indicating transmission of gradient information using mapping information and a set of UE-specific resources or a set of common resources, wherein the gradient information is associated with training a global machine learning model. The processor is further configured to generate a signal including quantized gradient information based on the mapping information and a set of gradients, wherein the set of gradients is associated with the training of the global machine learning model with local training data at the UE. Additionally, the processor further configured to transmit the signal to a network entity using the set of UE-specific resources or the set of common resources.

Another example aspect includes an apparatus for wireless communication at a user equipment (UE), comprising means for receiving one or more configurations indicating transmission of gradient information using mapping information and a set of UE-specific resources or a set of common resources, wherein the gradient information is associated with training a global machine learning model. The apparatus further includes means for generating a signal including quantized gradient information based on the mapping information and a set of gradients, wherein the set of gradients is associated with the training of the global machine learning model with local training data at the UE. Additionally, the apparatus further includes means for transmitting the signal to a network entity using the set of UE-specific resources or the set of common resources.

Another example aspect includes a computer-readable medium comprising stored instructions for wireless communication at a user equipment (UE), wherein the instructions are executable by a processor to receive one or more configurations indicating transmission of gradient information using mapping information and a set of UE-specific resources or a set of common resources, wherein the gradient information is associated with training a global machine learning model. The instructions are further executable to generate a signal including quantized gradient information based on the mapping information and a set of gradients, wherein the set of gradients is associated with the training of the global machine learning model with local training data at the UE. Additionally, the instructions are further executable to transmit the signal to a network entity using the set of UE-specific resources or the set of common resources.

An example aspect includes a method of wireless communication at a network entity, comprising generating a first set of configurations for a first set of user equipments (UEs)

indicating transmission of first gradient information using a corresponding set of UE-specific resources and first mapping information. The method further includes generating a second set of configurations for a second set of UEs indicating transmission of second gradient information using a set of common resources and second mapping information. Additionally, the method further includes transmitting the first set of configurations to the first set of UEs and the second set of configurations to the second set of UEs.

Another example aspect includes an apparatus for wireless communication at a network entity, comprising a memory and a processor coupled with the memory. The processor is configured to generate a first set of configurations for a first set of UEs indicating transmission of first gradient information using a corresponding set of UE-specific resources and first mapping information. The processor is further configured to generate a second set of configurations for a second set of UEs indicating transmission of second gradient information using a set of common resources and second mapping information. Additionally, the processor further configured to transmit the first set of configurations to the first set of UEs and the second set of configurations to the second set of UEs.

Another example aspect includes an apparatus for wireless communication at a network entity, comprising means for generating a first set of configurations for a first set of UEs indicating transmission of first gradient information using a corresponding set of UE-specific resources and first mapping information. The apparatus further includes means for generating a second set of configurations for a second set of UEs indicating transmission of second gradient information using a set of common resources and second mapping information. Additionally, the apparatus further includes means for transmitting the first set of configurations to the first set of UEs and the second set of configurations to the second set of UEs.

Another example aspect includes a computer-readable medium comprising stored instructions for wireless communication at a network entity, wherein the instructions are executable by a processor to generate a first set of configurations for a first set of UEs indicating transmission of first gradient information using a corresponding set of UE-specific resources and first mapping information. The instructions are further executable to generate a second set of configurations for a second set of UEs indicating transmission of second gradient information using a set of common resources and second mapping information. Additionally, the instructions are further executable to transmit the first set of configurations to the first set of UEs and the second set of configurations to the second set of UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1A:
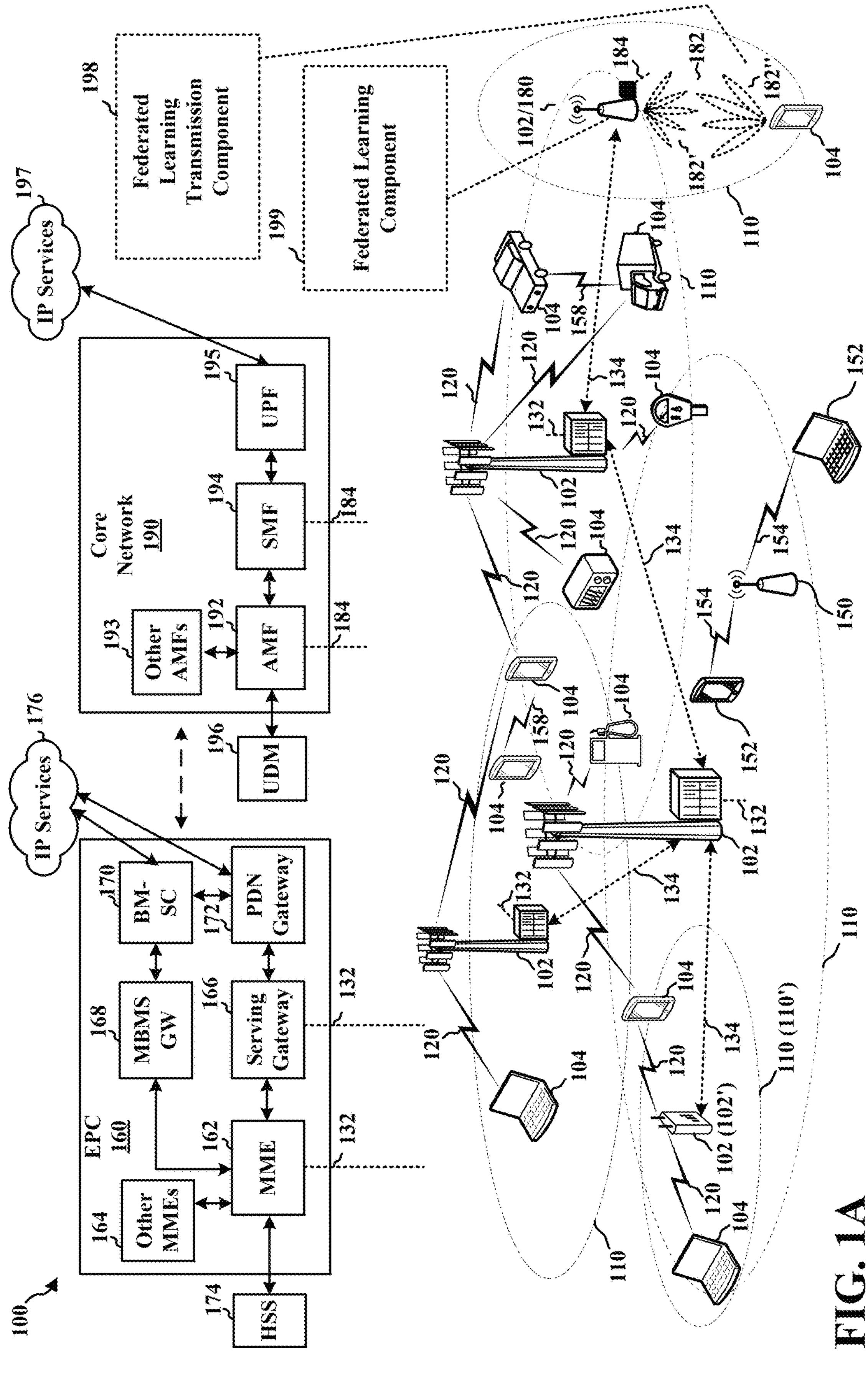
FIG. 1A is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Federated learning is a machine learning technique that enables machine learning models to be trained in a distributed manner using local training data of the different edge and/or end devices, such as UEs. However, existing techniques for implementing federated learning may consume a prohibitive number of orthogonal time/frequency resources or compromise privacy of local training data of the UEs.

Accordingly, the techniques described herein preserve the privacy of local training data while reducing the total amount of orthogonal time/frequency resources consumed by the set of devices involved in the training of a federated learning model.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1A is a diagram illustrating an example of a wireless communications system and an access network 100. The wireless communications system (also referred to as a wireless wide area network (WWAN)) includes base stations (BSs) 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, monitors, cameras, industrial/manufacturing devices, appliances, vehicles, robots, drones, etc.). IoT UEs may include machine type communications (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1A, in certain aspects, one or more of the UE 104 may include a federated learning transmission component 198. The federated learning transmission component 198 may include a receiving component 720, a generating component 725, and transmitting component 730. The receiving component 720 may be configured to receive one or more configurations indicating transmission of gradient information using mapping information and a set of UE-specific resources or a set of common resources, where the gradient information is associated with training a global machine learning model. The generating component 725 may configured to generating a signal including quantized gradient information based on the mapping information and a set of gradients, wherein the set of gradients is associated with the training of the global machine learning model with local training data at the UE. The transmitting component 730 may be configured transmit the signal to a network entity using the set of UE-specific resources or the set of common resources.

In certain aspects, one or more of the base stations 180 may be configured to include a federated learning component 199. The federated learning component 199 may include a generating component 1320, transmitting component 1330, receiving component 1335, and determining component 1340. The generating component 1320 may be configured to generate a first set of configurations for a first set of UEs indicating transmission of first gradient information using a corresponding set of UE-specific resources and first mapping information. The generating component 1320 may be configured to generate a second set of configurations for a second set of UEs indicating transmission of second gradient information using a set of common resources and second mapping information. The transmitting component 1330 may be configured to transmit the first set of configurations to the first set of UEs and the second set of configurations to the second set of UEs. The receiving component 1335 may be configured to receive a first set of signals from the first set of UEs via the corresponding set of UE-specific resources. The receiving component 1335 may be configured to receive an aggregated signal from the second set of UEs via the set of common resources. The determining component 1340 may be configured to determine a first aggregated set of gradients for the first set of UEs based on the first set of signals. The determining component 1340 may be configured to determine a combined set of gradients based on the first aggregated set of gradients and the aggregated signal.

Figure 1B:
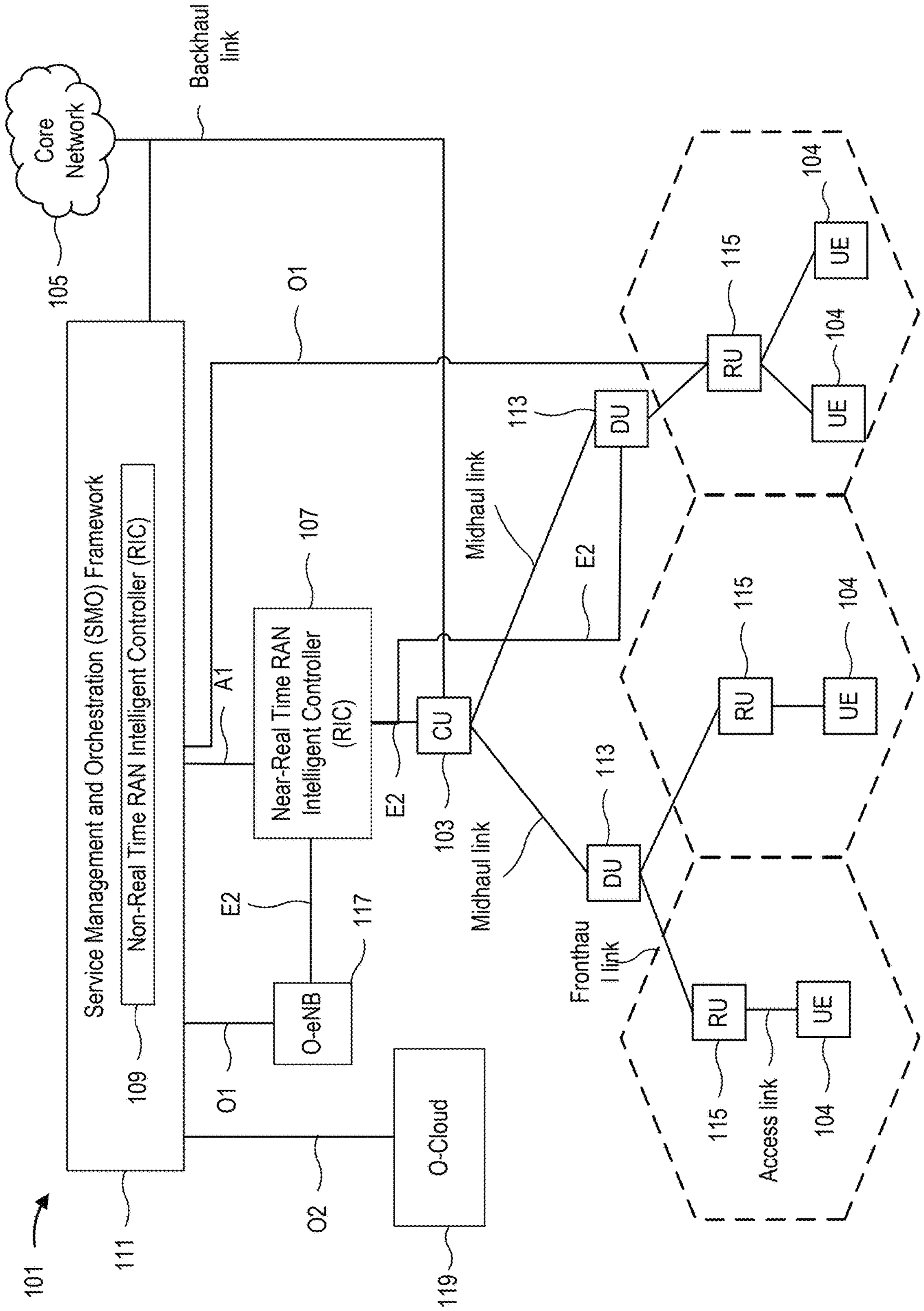
FIG. 1B is a diagram illustrating an example of disaggregated base station (BS) architecture, in accordance with various aspects of the present disclosure.

FIG. 1B shows a diagram illustrating an example of disaggregated base station 101 architecture. The disaggregated base station 101 architecture may include one or more central units (CUs) 103 that can communicate directly with a core network 105 via a backhaul link, or indirectly with the core network 105 through one or more disaggregated base station units (such as a Near-Real Time (Near-RT) RAN Intelligent Controller (RIC) 107 via an E2 link, or a Non-Real Time (Non-RT) RIC 109 associated with a Service Management and Orchestration (SMO) Framework 111, or both). A CU 103 may communicate with one or more distributed units (DUs) 113 via respective midhaul links, such as an F1 interface. The DUs 113 may communicate with one or more radio units (RUs) 115 via respective fronthaul links. The RUs 115 may communicate with respective UEs 104 via one or more radio frequency (RF) access links. In some implementations, the UE 104 may be simultaneously served by multiple RUs 115.

Each of the units, e.g., the CUS 103, the DUs 113, the RUs 115, as well as the Near-RT RICs 107, the Non-RT RICs 109 and the SMO Framework 111, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 103 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 103. The CU 103 may be configured to handle user plane functionality (i.e., Central Unit—User Plane (CU-UP)), control plane functionality (i.e., Central Unit—Control Plane (CU-CP)), or a combination thereof. In some implementations, the CU 103 can be logically split into one or more CU-UP units and one or more CU-CP units. The CU-UP unit can communicate bidirectionally with the CU-CP unit via an interface, such as the E1 interface when implemented in an O-RAN configuration. The CU 103 can be implemented to communicate with the DU 113, as necessary, for network control and signaling.

The DU 113 may correspond to a logical unit that includes one or more base station functions to control the operation of one or more RUs 115. In some aspects, the DU 113 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 113 may further host one or more low PHY layers. Each layer (or module) can be implemented with an interface configured to communicate signals with other layers (and modules) hosted by the DU 113, or with the control functions hosted by the CU 103.

Lower-layer functionality can be implemented by one or more RUs 115. In some deployments, an RU 115, controlled by a DU 113, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 115 can be implemented to handle over the air (OTA) communication with one or more UEs 104. In some implementations, real-time and non-real-time aspects of control and user plane communication with the RU(s) 115 can be controlled by the corresponding DU 113. In some scenarios, this configuration can enable the DU(s) 113 and the CU 103 to be implemented in a cloud-based RAN architecture, such as a vRAN architecture.

The SMO Framework 111 may be configured to support RAN deployment and provisioning of non-virtualized and virtualized network elements. For non-virtualized network elements, the SMO Framework 111 may be configured to support the deployment of dedicated physical resources for RAN coverage requirements which may be managed via an operations and maintenance interface (such as an O1 interface). For virtualized network elements, the SMO Framework 111 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 103, DUs 113, RUs 115 and Near-RT RICs 107. In some implementations, the SMO Framework 111 can communicate with a hardware aspect of a 4G RAN, such as an open eNB (O-eNB) 117, via an O1 interface. Additionally, in some implementations, the SMO Framework 111 can communicate directly with one or more RUs 115 via an O1 interface. The SMO Framework 111 also may include a Non-RT RIC 109 configured to support functionality of the SMO Framework 111.

The Non-RT RIC 109 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 107. The Non-RT RIC 109 may be coupled to or communicate with (such as via an A1 interface) the Near-RT RIC 107. The Near-RT RIC 107 may be configured to include a logical function that enables near-real-time control and optimization of RAN elements and resources via data collection and actions over an interface (such as via an E2 interface) connecting one or more CUs 103, one or more DUs 113, or both, as well as an O-eNB, with the Near-RT RIC 107.

In some implementations, to generate AI/ML models to be deployed in the Near-RT RIC 107, the Non-RT RIC 109 may receive parameters or external enrichment information from external servers. Such information may be utilized by the Near-RT RIC 107 and may be received at the SMO Framework 111 or the Non-RT RIC 109 from non-network data sources or from network functions. In some examples, the Non-RT RIC 109 or the Near-RT RIC 107 may be configured to tune RAN behavior or performance. For example, the Non-RT RIC 109 may monitor long-term trends and patterns for performance and employ AI/ML models to perform corrective actions through the SMO Framework 111 (such as reconfiguration via O1) or via creation of RAN management policies (such as A1 policies).

Figures 2A, 2B, 2C, 2D:
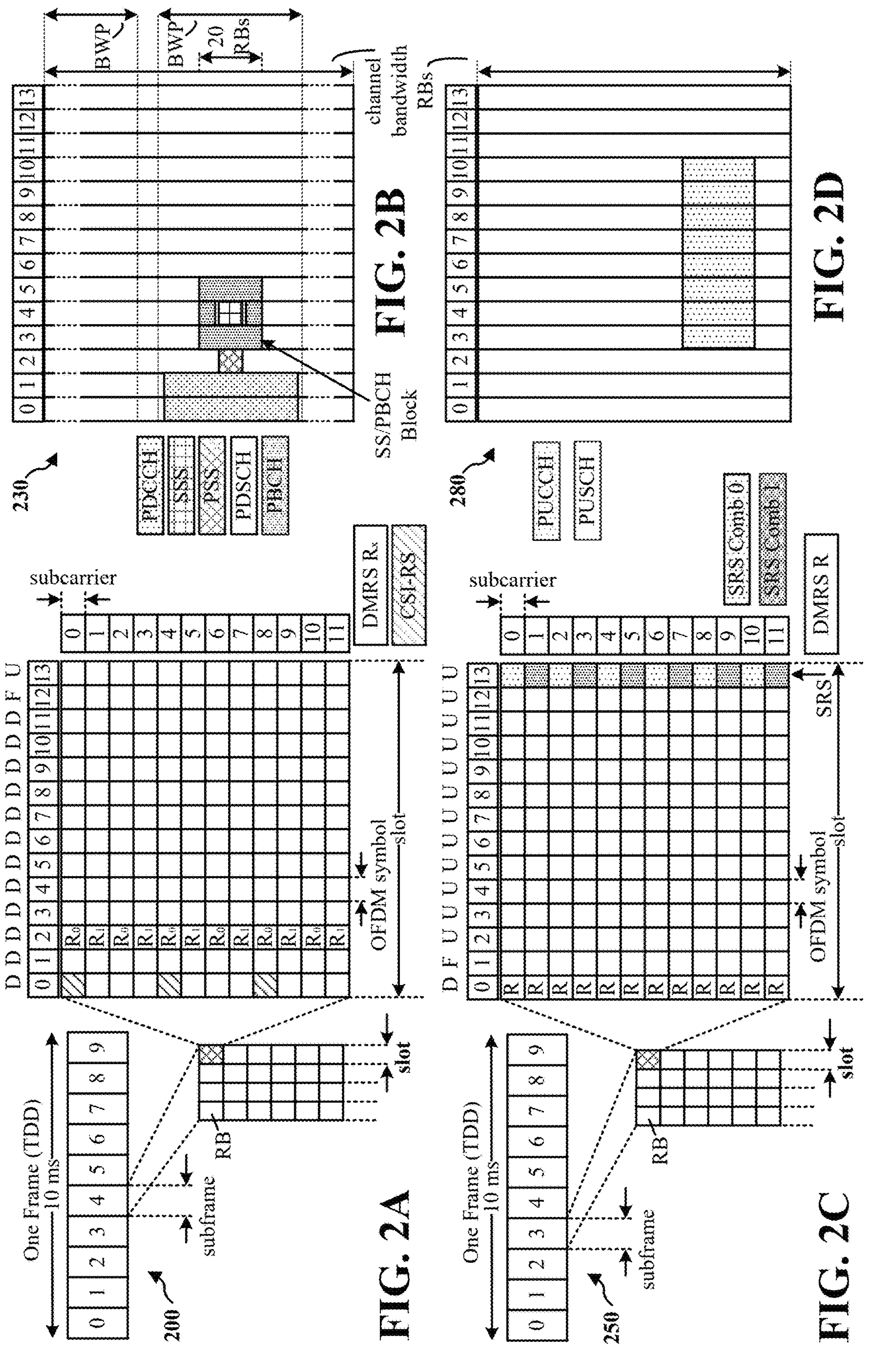
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

Referring to FIGS. 2A-D, the UE 104 and/or base station 102/180 may use one or more of the frame structures, channels, and/or resources of diagrams 200, 230, 250, and/or 280 for communications with one another. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^{\mu}$ slots/subframe. The subcarrier spacing and symbol length/duration are a function of the numerology. The subcarrier spacing may be equal to $2^{\mu}*15$ kilohertz (kHz), where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
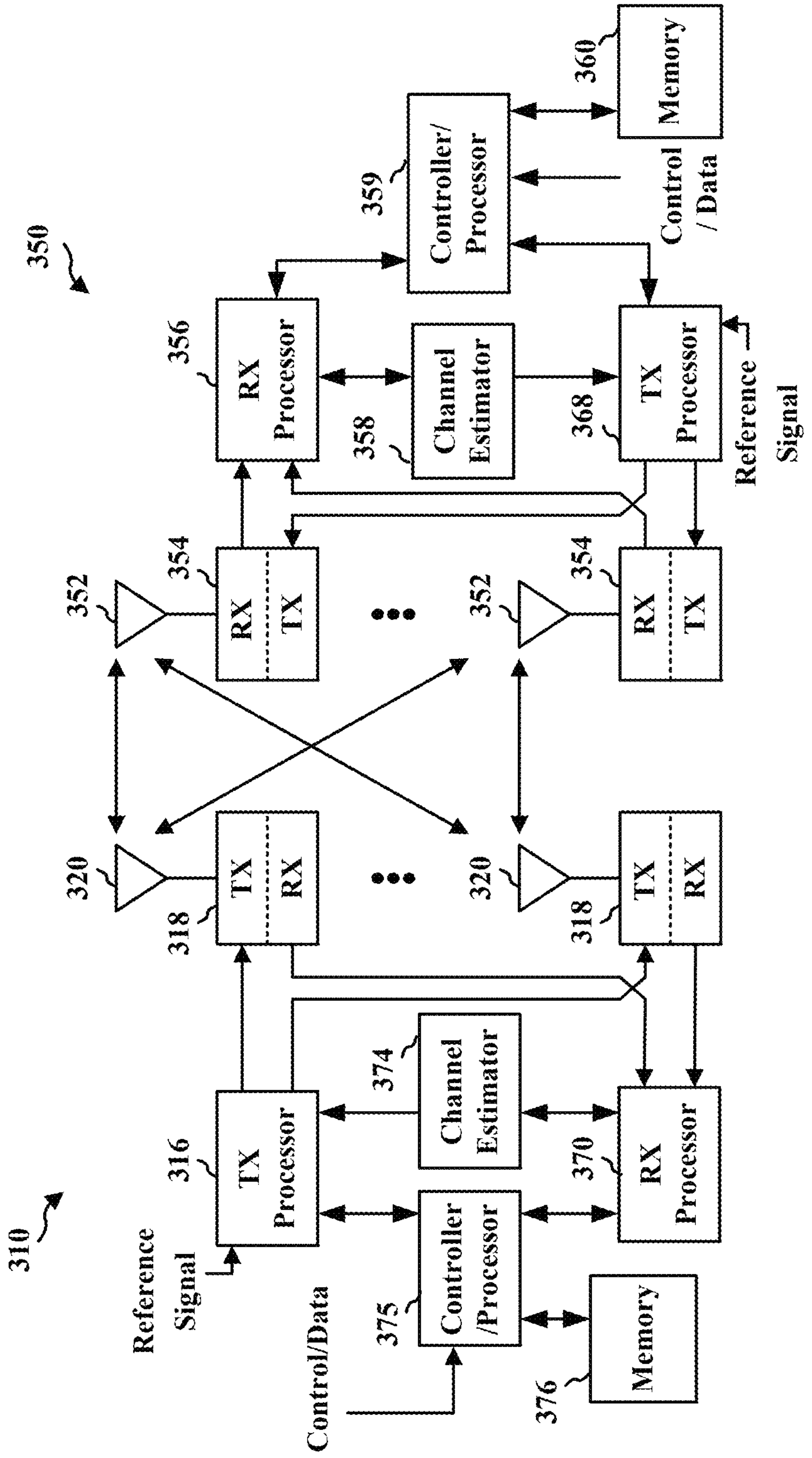
FIG. 3 is a diagram illustrating an example of a base station and user equipment (UE) in an access network.

Referring to FIG. 3, base station 310 may be similarly configured as base station 102/180 as described herein, and UE 350 may be similarly configured as UE 104 as described herein. FIG. 3 is a block diagram of the base station 310 in communication with the UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1A. For example, the memory 360 may include executable instructions defining the federated learning transmission component 198. The TX processor 368, the RX processor 356, and/or the controller/processor 359 may be configured to execute the search space monitoring component 198.

At least one of the TX processor 316, the RX processor 370, and the controller/processor 375 may be configured to perform aspects in connection with 199 of FIG. 1A. For example, the memory 376 may include executable instructions defining the federated learning component 199. The TX processor 316, the RX processor 370, and/or the controller/processor 375 may be configured to execute the search space component 199.

As described above, federated learning is a machine learning technique that enables machine learning models to be trained in a distributed manner using local training data of the different edge and/or end devices, such as UEs.

In federated learning, a central node or server, such as a BS, provides a global machine learning model to a set of devices, such as a set of UEs. For example, the BS may provide the global machine learning model to a set of UEs served by the BS. Each UE of the set of UEs may use their local training data to obtain gradients of the global machine learning model and transmits the gradients to the BS. The BS may aggregate the gradients received from the set of UEs and updates the global machine learning model based on the aggregated gradients. The BS may transmit the updated global machine learning model to the set of UEs. Federated learning enables privacy since local training data of a UE is not shared with any other UE or BS.

One of the techniques for implementing federated learning is for the BS to configure a set of orthogonal time/frequency resources for each UE (in the set of UEs selected by the BS. Such a federated learning technique will be referred to herein as federated UE-specific. In federated UE-specific, the UEs may transmit their gradients digitally (e.g., in a digital message) using the configured set of orthogonal time/frequency resources of the UE. However, the number gradients that a UE may transmit to the BS may be significantly large. As the number of gradients increases for each UE, the total number of resources across all the UEs in the set of UEs increases too. Furthermore, the number of resources required for transmission of the gradients from all the UEs may increase linearly with the number of UEs in the set of UEs. Therefore, such a technique can consume significant resources and become very expensive, at least resource wise, as the federated learning is scaled to more UEs.

Figure 4:
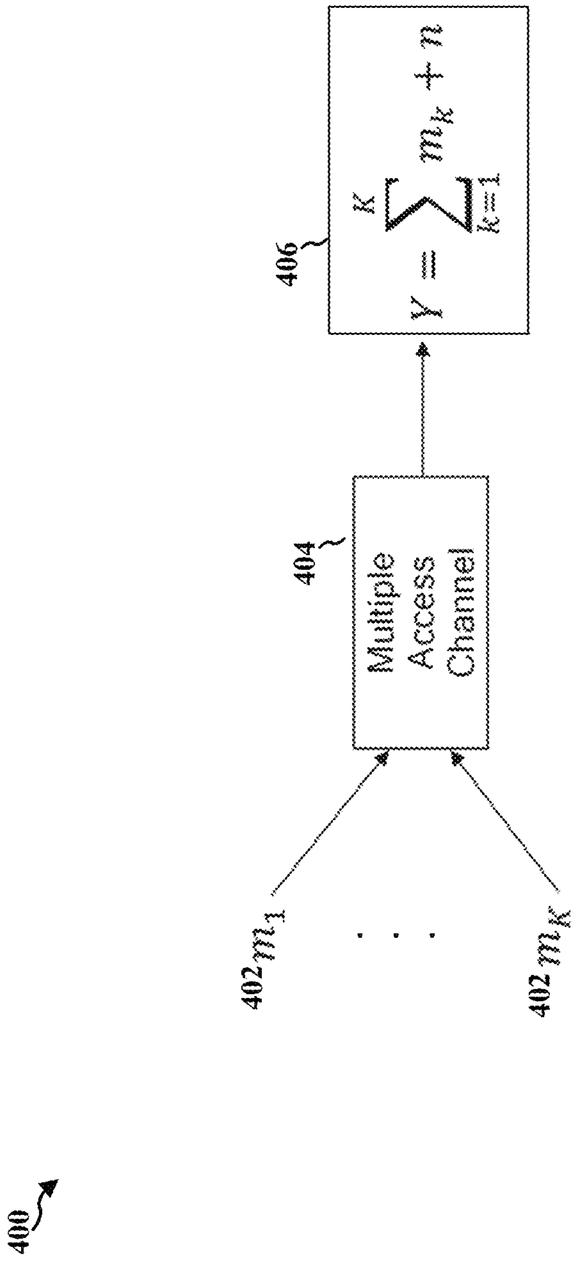
FIG. 4 is a diagram illustrating an example of over-the-air transmission using a same or common set of time/frequency resources.

Another technique for implementing federated learning is for the BS to configure a set of common resources for the set of UEs. For example, the BS may configure a set of same or common time/frequency resources, such as a multiple access channel, for the set of UEs. Such a federated learning technique will be referred to herein as a federated over-the-air transmission (OTA). In federated OTA, the UEs may modulate their gradients data using amplitude modulation, and transmit their amplitude modulated gradient data to the BS via a common analog waveform using the set of common resources (e.g., the multiple access channel). An example, of such a transmission is shown in FIG. 4. In federated OTA, as shown in FIG. 4, the UEs 1 through k (not shown separately) may transmit their amplitude modulated gradient data, indicated in the signals 402$m_1$ through 402$m_k$, via the common set of resources, multiple access channel 404, using a common analog waveform. The signals $m_l$ through $m_k$ may be combined over the air as a function of the multiple access channel 404 and the common analog waveform to provide a sum (e.g., an average) 406, of the amplitude modulated gradient data of the UEs 1 to k.

While federated OTA may consume fewer resources than the federated UE-specific, local training data of the UEs may be determined by illegitimate devices, such as an illegitimate BS, and the privacy of the local training data can be compromised. An example, of an illegitimate device compromising privacy of the local training data is shown in FIG. 5.

Figure 5:
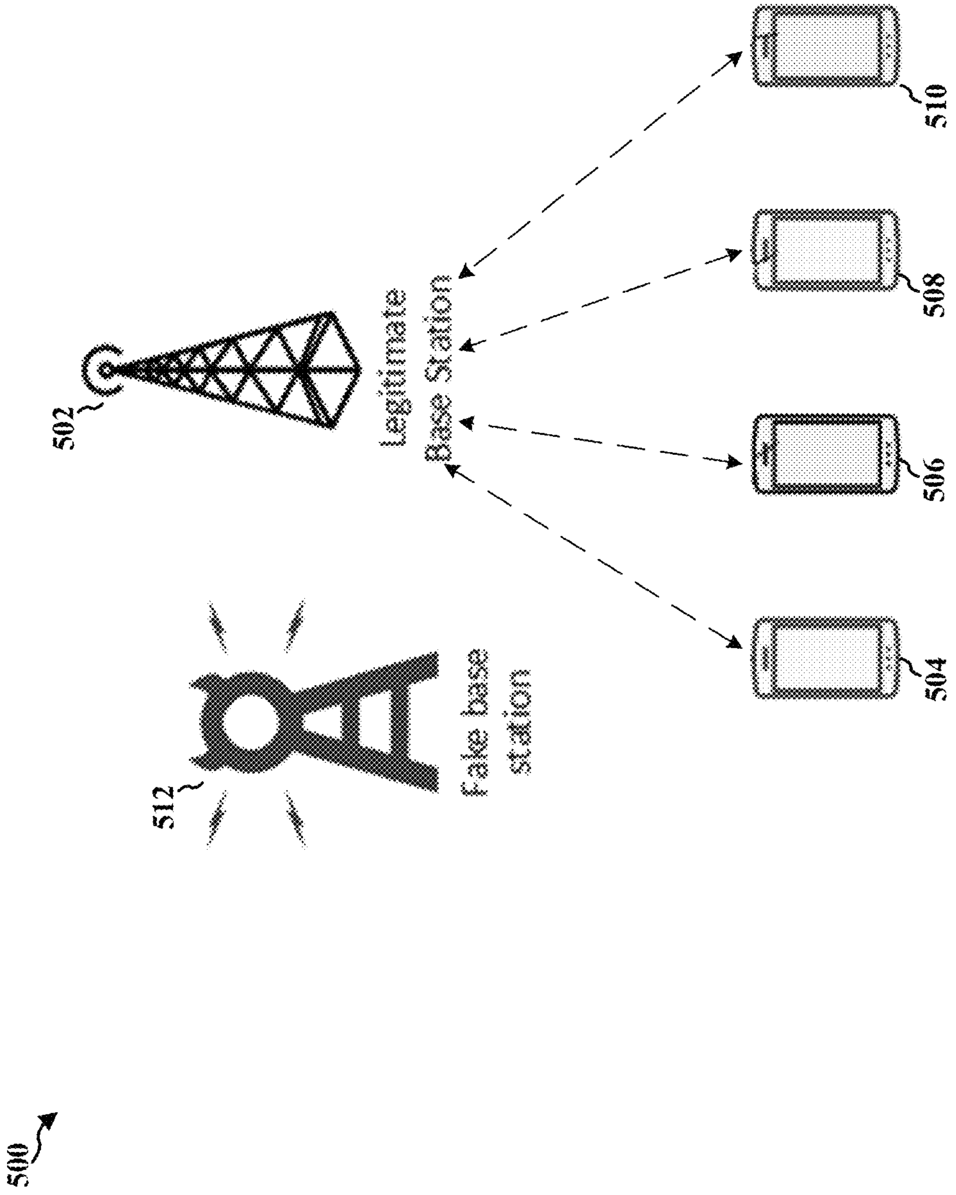
FIG. 5 is a diagram illustrating an example of a wireless communication system with an illegitimate base station and implementation of a federated learning technique using an analog over-the-air transmission.

FIG. 5 illustrates an example of a wireless communication system with an illegitimate base station and implementation of a federated OTA. In FIG. 5, a legitimate BS 502 may be connected (e.g., RRC connected) with the UEs 504, 506, 508, 510, and served by the BS 502. Federated OTA is implemented among the BS 502 and the UEs 504, 506, 508, and 510, and the BS 502 may configure a set of common resources (e.g., multiple access channel 404) for the UEs 504, 506, 508, and 510, and the UEs 504, 506, 508, and 510 may transmit their amplitude modulated gradient data using the common set of resources (e.g., multiple access channel 404) via a common analog waveform.

However, since the amplitude modulated gradient data of the UEs 504, 506, 508, and 510 is transmitted via a set of common resources, an illegitimate device, such as illegitimate BS 512, can snoop into the transmissions via the set of common resources and receive the amplitude modulated gradient data of the UEs 504, 506, 508, and 510. The illegitimate BS 512 may provide the received amplitude modulated gradient data to a machine learning framework/model (e.g., a generative adversarial network (GAN) framework/model) and determine private local training data of the UEs 504 506, 508, 510. Thus, the privacy of the local training data can be compromised. Additionally, the illegitimate BS 512, based on the snooping in on the transmissions from the UEs 504, 506, 508, and 510, may determine the machine learning task being performed or trained by the BS 502, and the UEs 504, 506, 508, and 510.

In some techniques of federated OTA, the UEs (e.g., UEs 504, 506, 508, and 510) may distort their gradient data by adding noise to the gradient data to hinder the illegitimate devices (e.g., BS 512) from determining the local training data of the UEs. However, adding noise to the gradient data can degrade convergence rate of the federated learning model. Furthermore, if a significant amount of noise is not added to the gradient data, then the illegitimate devices (e.g., BS 512) can determine the undistorted gradient data of the UEs by generating its own set of noise values and providing them to a machine learning framework (e.g., a GAN framework) to minimize or reduce the noise from the snooped amplitude modulated distorted gradient or minimize the distance between the gradient data transmitted by the UEs and the generated noise values. If a significant amount of noise is added, then the convergence rate of federated learning model can degrade significantly.

Therefore, existing transmission techniques in federated learning can consume a prohibitive amount of orthogonal time/frequency resources or compromise the privacy of local training data.

Aspects described herein relate to techniques for preserving the privacy of local training data while reducing the total amount of orthogonal time/frequency resources consumed by the set of devices involved in the training of a federated learning model. Additional details of these techniques are described herein with respect to FIGS. 6-17.

Figure 6:
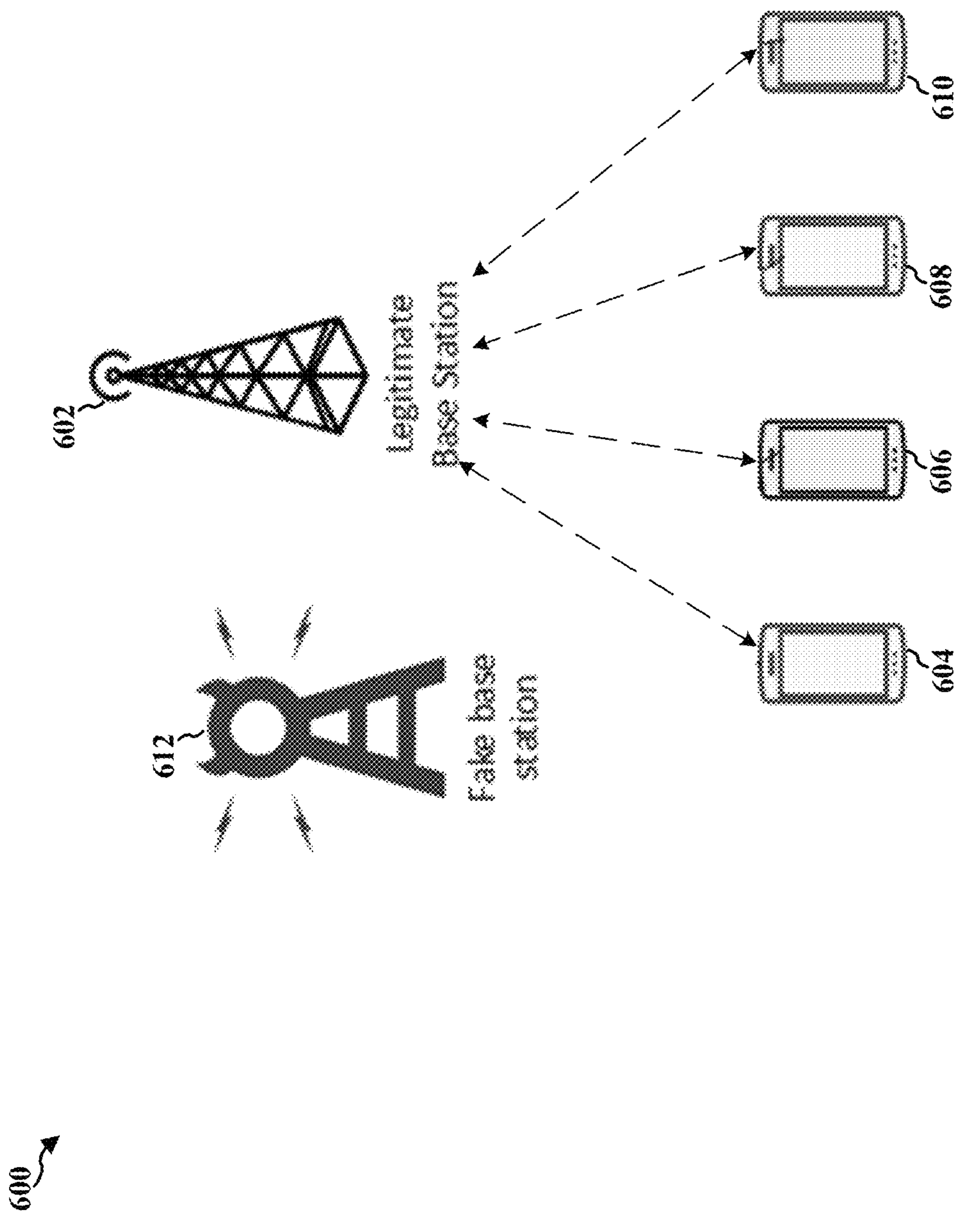
FIG. 6 is a diagram illustrating an example of a wireless communication system with an illegitimate base station and implementation of a hybrid analog-digital transmission scheme for federated learning.

Turning now to FIG. 6, there is shown an example of a wireless communication system with an illegitimate base station and implementation of a hybrid analog-digital transmission scheme for federated learning. In FIG. 6, BS 602 is a legitimate BS and may be similarly configured as BS 102/180, and UEs 604, 606, 608, and 610 may be similarly configured as UE 104.

In FIG. 6, UEs 604, 606, 608, and 610 may be connected (e.g., via an RRC connection) with BS 602, and the UEs 604, 606, 608, and 610 may be served by the BS 602. In some implementations, UEs 604, 606, 608, and 610, may be a subset of the total number of UEs served by the BS 602. The federated learning may be implemented between the BS 602 and the UEs 604, 606, 608, and 610 to train a machine learning model in a distributed manner using local training data of the UEs 604, 606, 608, and 610.

For each of the UEs 604, 606, 608, and 610, the BS 602 may configure transmission schemes of their gradient data for the machine learning model being trained. The BS 602 may determine a first subset of UEs from the UEs 604, 606, 608, and 610 for digital transmission and may determine a second subset of UEs from the UEs 604, 606, 608, and 610 for analog transmission. For example, the BS 602 may select UEs 604 and 606 for analog transmission and select UEs 608 and 610 for digital transmission. The BS 602 may signal the first subset (e.g., UEs 608 and 610) of UEs to perform digital transmission when transmitting their gradients and may signal the second subset (e.g., UEs 604 and 606) of UEs to perform analog transmission when transmitting their gradients.

For each UE in the first subset of UEs (e.g., UEs 608 and 610), the BS 602 may configure a set of UE-specific resources (e.g., a set of orthogonal time/frequency resources) for the UE to use to perform digital transmission of its gradient data. For example, the UE 608 may transmit its gradient data via a digital transmission using the set of UE-specific resources configured for UE 608. Similarly, the UE 610 may transmit its gradient data via a digital transmission using the set of UE-specific resources configured for UE 610. The BS 602 may also determine mapping information for the first subset (e.g., UEs 608 and 610) of UEs. The mapping information for the first subset of the UEs may indicate one or more codebooks configured for the first subset of UEs. In some implementations, the BS 602 may configure the one or more codebooks for each UE in the first subset of UEs. In some implementations, the codebooks may be of different sizes. For example, for BS 602 may configure K codebooks of sizes $N_1 > N_2 > \ldots . N_K$ for each UE in the first subset of UEs. In some implementations, each of the one or more codebooks may have different encoding characteristics. The different encoding characteristics of the codebooks may encode the gradients differently and/or map the gradients to a digital message differently.

In some implementations, a codebook may indicate to a UE (e.g., UEs 608, 610) the digital message to which a gradient obtained by the UE can be mapped. In some implementations, a codebook may indicate mapping to different digital messages for different ranges of gradient values. For example, a codebook may indicate that gradients within a first range, such as gradients between −5 to 5, may be mapped to a first digital message, and gradients within a second range, such as 5 to 15 may be mapped to a second digital message. In some implementations, some of the codebooks may indicate mapping to different digital messages for different ranges of gradients. For example, a first codebook of the K codebooks may indicate mapping gradients to a one digital message for gradients in the range −5 to 5 and to a another digital message for gradients in the range 5 to 15, a second codebook of the K codebooks may indicate mapping gradients to a digital message for gradients in the range −100 to 100, mapping to another digital message for gradients in the range 100 to 250, and mapping to yet another digital message for gradients in the range 250 to 500, and a third codebook of K codebooks may indicate mapping gradients to a digital message for gradients in the range −150 to 100 and mapping gradients to yet another digital message for gradients in the range 100 to 500.

In some implementations, the BS 602 may dynamically modify the one or more configured codebooks for the UEs in the first set of UEs (e.g., UEs 608 and 610). The BS 602 may indicate and/or transmit the configurations of the codebook using DCI and/or MAC-CE. The BS 602 may dynamically modify the one or more configured codebooks by transmitting and/or indicating the modified configurations of the one or more codebooks using DCI and/or MAC-CE. The UEs in the first set of UEs (608 and 610) may update the corresponding codebooks based on the corresponding modified configurations received via DCI and/or MAC-CE. In some implementations, the BS 602 may semi-statically configure the one or more codebooks. The BS 602 may indicate and/or transmit the configurations of the one or more mode codebooks using one or more RRC messages, and the BS 602 may modify the one or more indicated and/or transmitted codebooks by indicating and/or transmitting modified configurations in a DCI and/or MAC-CE. In some implementations, the BS 602 may configure the one or more codebooks and one or more configured keys associated with the one or more codebooks to be semi-persistent. The BS 602 may indicate to the UEs in the first set of UEs slot-based usage information of the one or more codebooks. In some implementations, the BS 602 may indicate the codebook and/or an associated key to be used in the different slots by the UEs in the first set of UEs (e.g., UEs 608 and 610). For example, the BS 602 may indicate to UE 608 to use codebook $C_l$ and key $k_l$ in $T_1$ slots, and to use codebook $C_m$ and key $k_m$ in $T_2$ slots, and so on. By indicating the codebooks and/or keys as described above, randomness and freshness of the codebooks and/or the keys can be induced and further enhance security of the keys and further reduce any chances of an illegitimate device, e.g., BS 612, to guess the key or the codebook used by the UEs in the first set of UEs (608 and 610).

One or more keys maybe configured for the first subset of UEs to encrypt one or more digital messages. In some implementations, the BS 602 may configure the one or more keys for each UE in the first subset of UEs. The keys may be of different lengths. For example, the BS 602 may configure K keys of length $\log_2 N_1, \log_2 N_2, \ldots \log_2 N_K$ bits. In some implementations, the one or more keys of a UE in first subset of UEs may be associated with or correspond to the one or more codebooks of the UE. For example, the $l^{th}$ key, $k_l$, of the K keys configured for a UE may be associated with $l^{th}$ codebook of the K codebooks configured for the UE.

The BS 602 may transmit an instruction or command (e.g., SecurityModeCommand) to cause the first subset of UEs to derive a set of keys associated with the BS 602. The set of keys associated with the BS 602 are different from the keys configured for the UEs in the first subset of UEs. In some implementations, one of the set of keys associated with BS 602 may be a gNB key, $K_{gNB}$. In some implementations, one key of the set of keys associated with BS 602 may be an RRC key, $K_{RRC}$. The RRC key may be unique for each UE in the first subset of keys.

Each UE in the first subset of UEs (e.g. UE 608 and UE 610) may be configured to derive the set of keys associated with the BS 602 based on receiving the instruction or command (e.g., SecurityModeCommand) to derive the set of keys associated with the BS 602. In some implementations, each UE in the first subset of UEs may derive the set of keys associated with the BS 602 using one or more 3GPP procedures configured for deriving keys associated with the BS 602.

In some implementations, the BS 602 may not transmit the configured keys to the first subset of UEs to prevent the keys from being intercepted by any illegitimate devices. The BS 602 may cause the first subset of UEs to implicitly derive the configured keys. Each UE of the first subset of UEs may derive its one or more configured keys using a predetermined or preconfigured key derivation function (e.g., a 3GPP key derivation function). Each UE of the first subset of UEs may be configured to derive the configured keys based on one or more keys of the set of keys associated with the BS 602 and the key derivation function. For example, UE 608 may derive one or more keys configured by the BS 602 for UE 608 by using the RRC key for UE 608 in the predetermined or preconfigured key derivation function. Similarly, UE 610 may determine one or more keys configured by the BS 602 for UE 610 by using the RRC key for UE 610 in the predetermined or preconfigured key derivation function.

In some implementations, BS 602 may transmit one or more nonce values (e.g., random number(s)) to each UE in the first subset of UEs (e.g., UEs 608 and 610). In some implementations, the one or more nonce values may be indicated in one or configurations transmitted by the BS 602 to the UEs. The UEs in the first subset of the UEs may derive their respective configured keys based on one or more nonce values, one or more keys of the set of keys associated with the BS 602 and the key derivation function. For example, UE 608 may derive one or more keys configured by the BS 602 for UE 608 by using one or more received nonce values and the RRC key for UE 608 in the predetermined or preconfigured key derivation function. Similarly, UE 610 may determine one or more keys configured by the BS 602 for UE 610 by using one or more received nonce values and the RRC key for UE 610 in the predetermined or preconfigured key derivation function. In some implementations, each UE in the first subset of UEs may determine a key, $k_l$, of the K keys configured for the UE, by $k_l$=KDF ($K_{RRC}$, $p_l$), where $p_l$ is the $l^{th}$ nonce value received by the UE. In some implementations, the BS 602 may encode the configured keys for the UEs in the first subset of UEs and transmit the encoded keys to the UEs. For example, the BS 602 may encode a configured key by providing the configured key and a key associated with the BS 602, such as $K_{RRC}$, to an XOR function. The UEs in the first subset of UEs may decode their respective configured keys from the received encoded keys by using the one or more keys associated with the BS 602. For example, the UE 608 may decode a configured key, $k_l$, by providing the key associated with the BS 602 derived by the UE 608, such as $K_{RRC}$ of UE 608, and the received encoded key to an XOR function.

In some implementations, the UEs in first subset of UEs may decode one or more configured keys using a decoding function corresponding to the encoding function used by the BS 602 to encode the configured keys. In some implementations, the UEs 604, 606, 608, and 610 be may configured with one or more decoding functions corresponding to one or more encoding functions that the BS 602 may use to encode the configured keys, and the BS 602 may indicate (e.g., via one or more configurations) the used encoding function to the UEs in the first subset of UEs. By transmitting the encoded configured keys, the configured keys for the UEs are transmitted to the UEs in the first subset of UEs in a secure manner and prevent an illegitimate devices from snooping or intercepting the configured keys.

The UEs in the first subset of UEs (e.g., UEs 608 and 610) may map their gradients to a digital message based on the mapping information received from the BS 602. As described above, mapping information for a UE in the first subset of UEs may be received via one or more configurations from the BS 602. The mapping information received by a UE may indicate one or more codebooks configured for the UE, the UE may map a set of gradients to a digital message based on a codebook from the one or more codebooks indicated in the mapping information. In some implementations, one or more of the indicated codebooks may be vector quantizer(s), and the first set of UEs may quantize their respective sets of gradients using a codebook of the one or more indicated codebooks to generate quantized gradient information for each of the respective sets of gradients. Each UE in the first set of UEs may map the respective quantized gradient information to a digital message based on the codebook.

Each UE in the first set of UEs may encrypt its digital message into an encrypted digital message using a key configured for the UE. For example, UE 608 may encrypt its digital message using a key configured for the UE 608, and similarly, UE 610 may encrypt its digital message using a key configured for the UE 610. As described above, the UEs in the first set of UEs may derive or decode the keys configured for the UE. In some implementations, each UE in the first set of UEs may map multiple sets of gradients obtained by the UE over multiple instants of time to the digital message Each UE in the first set of UEs may transmit their respective encrypted messages to the BS 602 using the set of resources (e.g., uplink orthogonal time/frequency resources) configured for the UE. In some implementations, the UE may generate a digital signal that includes the encrypted message, and transmits the digital signal to the BS 602 using the set of resources (e.g., uplink orthogonal time/frequency resources) configured for the UE. For example, UE 608 may transmit the encrypted messages or the digital signal comprising the encrypted messages in a PUSCH.

For the UEs in the second subset of UEs (e.g., UEs 604 and 606), the BS 602 may configure a common set of resources (e.g., a multiple access channel) for the UEs transmit data related to their gradients via analog transmission or perform analog transmission of data related to their gradients. The BS 602 may also determine mapping information for the second subset (e.g., UEs 604 and 606) of UEs.

In some implementations, the mapping information for the second subset of the UEs may indicate one or more codebooks configured for the second subset of UEs. In some implementations, the codebooks may be of different sizes. For example, for BS 602 may configure P codebooks of sizes $N_1 > N_2 > \ldots N_P$ for the second subset of UEs. The one or more codebooks may induce controlled distortion of the gradients of the UEs in the second set of UEs (e.g., 604 and 606), when the UEs encode their respective gradients using the one or more codebooks.

In some implementations, the BS 602 may dynamically modify the one or more configured codebooks for the UEs in the second set of UEs (e.g., UEs 604 and 606). The BS 602 may indicate and/or transmit the configurations of the codebook using DCI and/or MAC-CE. The BS 602 may dynamically modify the one or more configured codebooks by transmitting and/or indicating the modified configurations of the one or more codebooks using DCI and/or MAC-CE. The UEs in the second set of UEs (e.g., UEs 604 and 606) may update the corresponding codebooks based on the corresponding modified configurations received via DCI and/or MAC-CE. In some implementations, the BS 602 may semi-statically configure the one or more codebooks. The BS 602 may indicate and/or transmit the configurations of the one or more mode codebooks using one or more RRC messages, and the BS 602 may modify the one or more indicated and/or transmitted codebooks by indicating and/or transmitting modified configurations in a DCI and/or MAC-CE. In some implementations, the BS 602 may configure the one or more codebooks and one or more configured keys associated with the one or more codebooks to be semi-persistent. The BS 602 may indicate to the UEs in the second set of UEs slot-based usage information of the one or more codebooks. In some implementations, the BS 602 may indicate the codebook and/or an associated key to be used in the different slots by the UEs in the second set of UEs (e.g., UEs 604 and 606). For example, the BS 602 may indicate to UE 608 to use codebook $C_l$ and key $k_l$ in $T_1$ slots, and to use codebook $C_m$ and key $k_m$ in $T_2$ slots, and so on. By indicating the codebooks and/or keys as described above, randomness and freshness of the codebooks and/or the keys can be induced and further enhance security of the keys and further reduce any chances of an illegitimate device, e.g., BS 612, to guess the key or the codebook used by the UEs in the second set of UEs (e.g., UEs 604 and 606).

In some implementations, the controlled distortion of a codebook may be an amount of noise determined by the BS 602 to be added to the gradients obtained by the UE or a predetermined amount of noise to be added to the gradients obtained by the UE. In some implementations, the amount of noise may be determined to cause non-convergence or delay the convergence of the federated learning model for an illegitimate device, such as the illegitimate BS 612.

Each UE in the second subset of UEs (e.g., UEs 604 and 606) may distort their obtained gradients based on the one or more codebooks configured by the BS 602 for the second subset of UEs and indicated in the mapping information. For example, the UE 604 may distort its obtained gradients by encoding them using a codebook of the one or more codebooks. Similarly, the UE 606 may distort its obtained gradients by encoding them using a codebook of the one or more codebooks. Each UE in the second subset of UEs (e.g., UEs 604 and 606), may map a set or vector of its obtained gradients to a second gradient set or vector based on the one or more codebooks indicated in the mapping information. The second gradient set or vector includes the distorted gradients corresponding to the obtained gradients. In some implementations, each codebook of the one or more codebooks may have different distortion characteristics. The different distortion characteristics of the codebooks may distort the gradients differently. For example, each codebook of the one or more codebooks may add a different amount of noise to the obtained gradients when encoded.

In some implementations, the BS 602 may determine a set of parameters for noise distribution and transmit the noise parameters to the UEs in the second subset of the UEs (e.g., UEs 604 and 606). In some implementations, the noise parameters may be indicated in the mapping information transmitted or indicated to UEs in the second subset of UEs. The UEs in the second set of UEs may generate noise values based on the noise parameters and add the noise values to the obtained gradients to generate distorted gradients. For example, UE 604 may generate a set or a vector of noise values based on the noise parameters indicated in the mapping information, and add the noise values to a set or a vector of gradients.

Each UE in the second set of UEs (e.g., UEs 604 and 606) may transmit their respective distorted gradients to the BS 602 in an analog transmission using the common set of resources (e.g., a multiple access channel) configured for the second set of UEs (e.g., UEs 604 and 606). The UEs in the second subset of UEs may amplitude modulate their respective distorted gradients and transmit the amplitude modulated signal to the BS 602 in an analog transmission using the common set of resources. Since each UE in the second subset of UEs transmits using the same common set of resources, their analog transmissions (e.g., analog waveforms of the amplitude modulated distorted gradients) can be combined or aggregated into an aggregated signal of gradients data or distorted gradients data of all of the UEs in the second subset of UEs. The BS 602 receives the aggregated signal of the distorted gradients of the second subset of UEs (e.g., UEs 604 and 606) via the configured common set of resources (e.g., multiple access channel).

The BS 602 also receives one or more encrypted messages from each UE in the first set of UEs (e.g., UEs 608 and 610). From each UE in the first set of UEs, the BS 602 may receive the encrypted messages of the UE in one or more digital signals via the resources configured for that UE (e.g., the UE-specific resources). The BS 602 may decrypt the encrypted messages received from the first subset of UEs (e.g., UEs 608 and 610). As described above, the BS 602 may configure one or more keys for each UE in the first set of UEs (e.g., UEs 608 and 610).

In some implementations, the BS 602 may signal to a UE in the first set of UEs, the key to be used by that UE for encrypting its respective digital messages. In some implementations, as described above, the set of keys configured for a UE may be associated with the set of codebooks configured for that UE. For example, each configured key may be associated with a configured codebook. The BS 602 may signal (e.g., via RRC message) a codebook to a UE in the first set of UEs for encoding the set of gradients, and the BS 602 may determine and/or identify the key used for encrypting the digital message based on the codebook signaled to the UE.

In some implementations, the BS 602 may determine and/or identify a set of keys (e.g., $K_{gNB}$ Or $K_{RRC}$) associated with the BS 602, and determine and/or identify the key used by the UE to encrypt the message based on a key (e.g., $K_{gNB}$ or $K_{RRC}$) of the set of keys associated with the BS 602 and/or a codebook signaled to the UE. In some implementations, the BS 602 may indicate (e.g., via RRC message, a configuration, mapping information, and the like) to the UE the key (e.g., $K_{gNB}$ Or $K_{RRC}$) in the set of keys associated with the BS 602 to derive, and the BS 602 may use the corresponding indicated key (e.g., $K_{gNB}$ Or $K_{RRC}$) to determine the key used by the UE to encrypt the digital message of the UE.

In some implementations, as described above, the BS 602 may transmit a nonce signal (e.g., a random number) to the UE, and the BS 602 may track the nonce signal transmitted to the UE. The BS 602 may determine the key used for encrypting based on a key from the set of keys associated with the BS 602, the nonce signal, and/or the codebook indicated by the BS 602.

In some implementations, as described above, the BS 602 may transmit a set of encoded keys to a UE in the first set of UEs (e.g., UEs 608 and 610), where an encoded key is encoded based on a key from the set of keys associated with the BS 602 and a key configured for the UE (e.g., UE 608 or 610) for encrypting the digital message and/or associated with the codebook. The BS 602 may store the configured key in association with the transmitted encoded key and identify the configured key used in encrypting the digital message of the UE based on the transmitted encoded key. In some implementations, the BS 602 may determine and/or identify the configured key used to encrypt the digital message of a UE based on an encoded key transmitted to that UE and/or the key from the set of keys associated with the BS 602 used for the encoded key.

The BS 602 may decrypt the received digital messages using the determined and/or identified configured keys, and decode the decrypted digital messages based on the corresponding the codebooks. As described above, the BS 602 may signal, indicate, and/or transmit a configured codebook to the UE (e.g., 608 or 610) for encoding and/or mapping a set of gradients to a digital message, and the BS 602 may decode and/or de-map the decrypted digital message into a set of gradients obtained by that UE (e.g., UE 608 or 610).

The BS 602 may aggregate the set of gradients obtained by each UE in the first set of UEs (e.g., UEs 608 and 610) to form an aggregated gradient of the UEs in the first set of UEs (e.g., UEs 608 and 610), and combine it with the aggregated gradient of the UEs in the second set of UE (e.g., UEs 604 and 606) received via the analog signal over the common set of resources. In some implementations the combined aggregated gradient may be represented by $Y=Y_{DIG}+Y_{OTA}$, where y is the combined signal, $Y_{DIG}$ is the aggregated gradient of the UEs in the first set of UEs (e.g., UEs 608 and 610) and $Y_{OTA}$ is the aggregated gradient of the UEs in the second set of UEs (e.g., UEs 604 and 606).

In some implementations, the BS 602 may determine the first set of UEs and the second set of UEs based on a quality index of gradients of the UEs 604, 606, 608, and 610. The BS 602 may determine a quality index of gradients for each of the UEs 604, 606, 608, and 610 based on one or more sets of the gradients previously received from the UEs 604, 606, 608, and 610. The quality index of gradients of a UE may indicate a quality of the local training data of the UE. The BS 602 may be configured to determine or select the UEs with high quality local training data for digital transmission and for the first set of UEs (e.g., UEs 608 and 610) and determine or select the UEs with low quality local training data for analog transmission and for the second set of UEs (e.g., UEs 604 and 606).

The BS 602 may determine the quality index by determining a difference between the gradients previously received for each feature or dimension, and comparing the differences or an average difference with a threshold difference level. For example, the BS 602 may determine that the average difference for 3 features for UE 608 is 0.4, 0.1, and 0.12, and the threshold difference level is 0.2, 0.14, and 0.15, then the BS 602 determines that the gradients for two features satisfy the threshold difference level. The BS 602 may determine that the quality index of a UE satisfies a threshold quality index if a threshold number of gradients satisfy the threshold difference level. For example, if the threshold number of features that should satisfy the threshold difference level is 2, then BS 602 determines that the quality index of the UE 608 satisfies the threshold quality index.

The BS 602 may determine and/or select a UE to be in the first set of UEs or for digital transmission if the quality index of the UE satisfies a threshold quality index. Continuing with the above example, the BS 602 may determine and/or select the UE 608 to be in the first set of UEs and for digital transmission because the quality index of the UE 608 satisfies the threshold quality index. In some implementations, the BS 602 may periodically (e.g., every N number of periods, every 10 minutes, and the like) determine whether a quality index of a UE satisfies the threshold quality index, and adjust the set of first UEs and/or the second set of UEs periodically based on the quality indexes of the UEs. In some implementations, at least one UE in the first set of UEs may have been previously determined to be part of the second set of UEs.

With the techniques described above, the BS 602 can determine the combined desired gradient Y without comprising all of the gradient data or all of the local training data and without using significant number of orthogonal time/frequency resources. Furthermore, with the techniques described above, the BS 602 can determine the combined desired gradient Y without the illegitimate BS 612 determining the combined desired gradient Y because the illegitimate BS 612 will not be able to at least decrypt the encrypted messages transmitted by the UEs in the first set of UEs (e.g., UEs 608 and 610). Therefore, the illegitimate BS 612 will not be able to determine the machine learning model and/or the complete set of gradients needed to optimize and/or train the machine learning model. Furthermore, because the BS 612 is unable to decrypt the encrypted messages, the BS 612 will be unable to determine any of the local training data of the UEs in the first set of UEs (e.g., UEs 608 and 610). Therefore, the techniques described above allow for federated learning to be securely implemented across a BS and a set of UEs (e.g., UEs served by the BS) without using significant number of orthogonal time/frequency resources and without comprising local training data of the UEs in the set of UEs.

Figure 7:
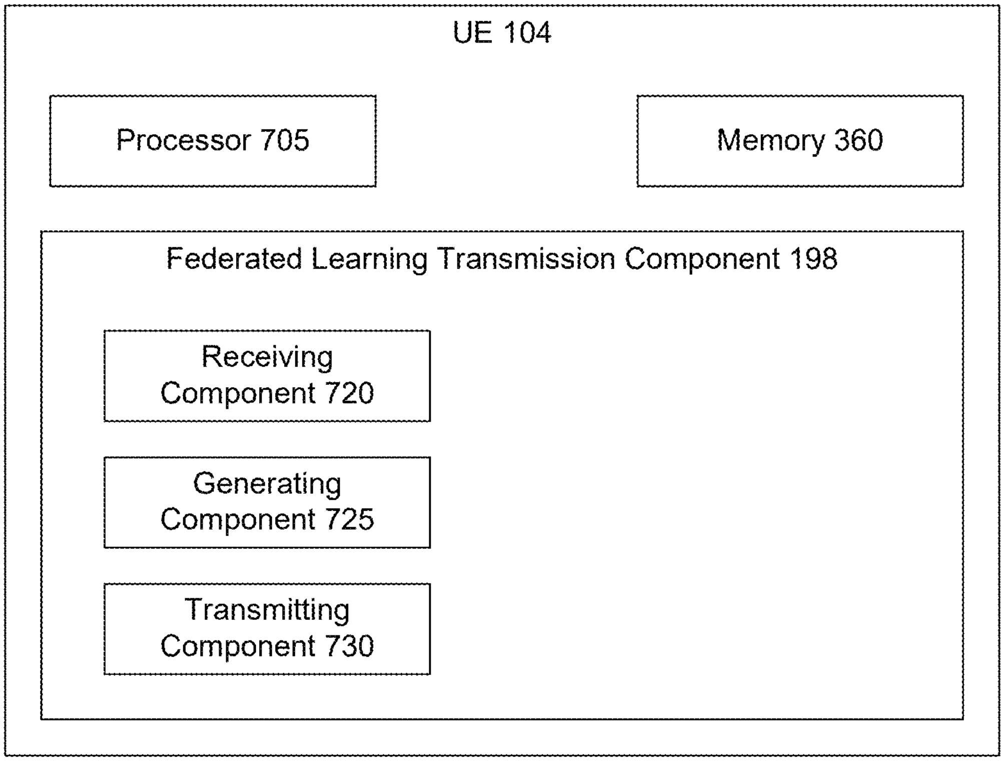
FIG. 7 is a diagram illustrating an example of a hardware implementation for an example apparatus.
Figure 8:
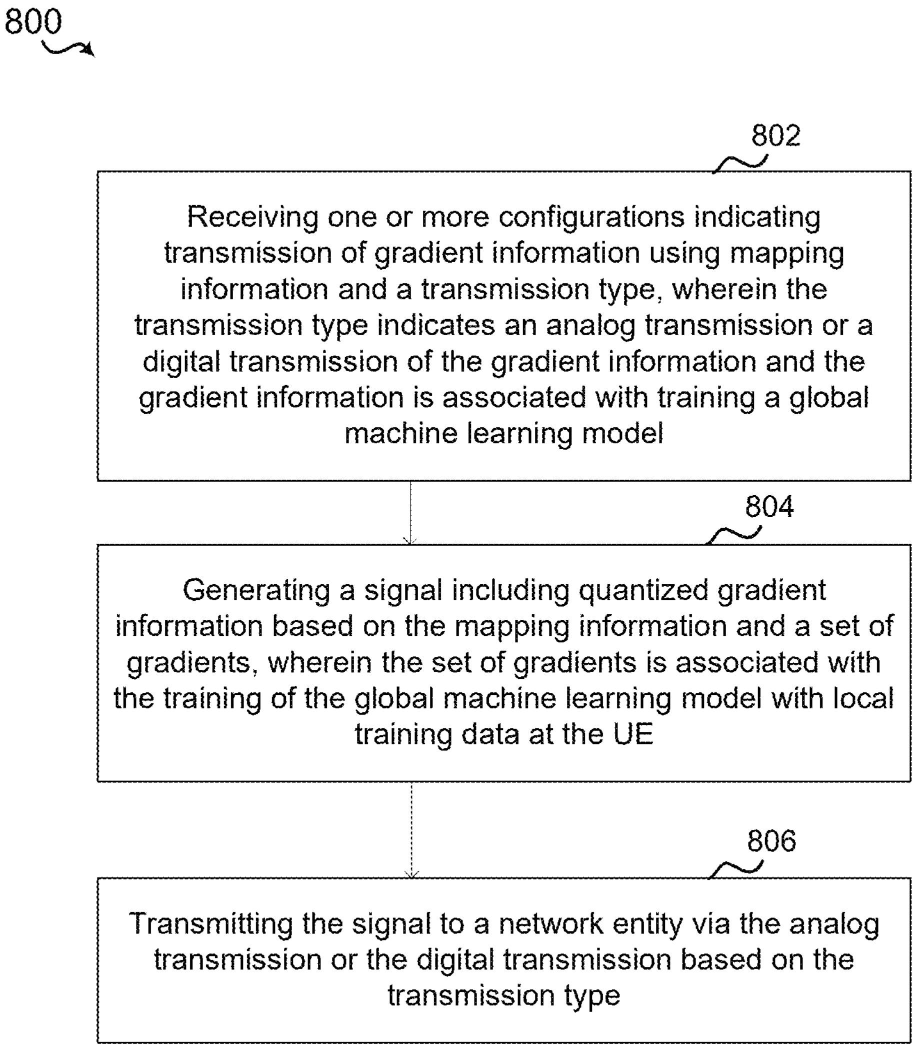
FIG. 8 is a flowchart of a method of wireless communication.

Referring to FIG. 7 and FIG. 8, in operation, UE 104 may perform a method 800 of wireless communication, by such as via execution of federated learning transmission component 198 by processor 705 and/or memory 360.

At block 802, the method 800 includes receiving one or more configurations indicating transmission of gradient information using mapping information and a transmission type, wherein the transmission type indicates an analog transmission or a digital transmission of the gradient information and the gradient information is associated with training a global machine learning model. For example, in an aspect, UE 104, processor 705, memory 360, federated learning transmission component 198, and/or receiving component 720 may be configured to or may comprise means for receiving one or more configurations indicating transmission of gradient information using mapping information and a set of UE-specific resources or a set of common resources, wherein the gradient information is associated with training a global machine learning model.

For example, the receiving at block 802 may include one or more messages (e.g., RRC messages) indicating the one or more configurations.

Further, for example, the UE 104 may receive the one or more configurations via a wireless signal at an antenna or antenna array (e.g., antenna 352) as described in FIG. 3, and processes the wireless signal as described in FIG. 3.

At block 804, the method 800 includes generating a signal including quantized gradient information based on the mapping information and a set of gradients, wherein the set of gradients is associated with the training of the global machine learning model with local training data at the UE. For example, in an aspect, UE 104, processor 705, memory 360, federated learning transmission component 198, and/or generating component 725 may be configured to or may comprise means for generating a signal including quantized gradient information based on the mapping information and a set of gradients, wherein the set of gradients is associated with the training of the global machine learning model with local training data at the UE.

For example, the generating at block 804 may include obtaining a set of gradients by the UE 104 for the machine learning model using local training data of the UE 104 and generating the quantized information based on the obtained set of gradients and a codebook indicated in the one or more configurations or mapping information. In some implementations, the generating at block 804 may include amplitude modulating the generated quantized information.

Further, for example, the generating at block 804 may be performed for the reasons as described above.

At block 806, the method 800 includes transmitting the signal to a network entity (e.g., BS 102/180, BS 602, and the like) via the analog transmission or the digital transmission based on the transmission type. For example, in an aspect, UE 104, processor 705, memory 360, federated learning transmission component 198, and/or transmitting component 730 may be configured to or may comprise means for transmitting the signal to a network entity (e.g., BS 102/180, BS 602, and the like) using the set of UE-specific resources or the set of common resources.

For example, the transmitting at block 806 may include transmitting the signal to the network entity (e.g., BS

102/180, BS 602, and the like) via a wireless signal from an antenna or antenna array (e.g., antenna 352) as described in FIG. 3.

In an alternative or additional aspect, transmitting the signal includes transmitting the signal using the set of UE-specific resources, and wherein the signal includes the quantized gradient information in an encrypted message having the set of gradients encrypted based on the mapping information.

In an alternative or additional aspect, transmitting the signal includes transmitting the signal using the set of common resources, and wherein the signal includes the quantized gradient information as a distorted gradient vector based on the set of gradients distorted according to the mapping information. In this aspect, the mapping information comprises a set of parameters of noise distribution to apply to a gradient vector associated with the set of gradients.

In an alternative or additional aspect, receiving the one or more configurations includes receiving an indication of the mapping information in downlink control information, in a protocol layer control element, in a radio resource control signaling message, or in slot-based usage information.

In an alternative or additional aspect, the mapping information indicates at least one of a plurality of codebooks each having different encoding characteristics.

Figure 9:
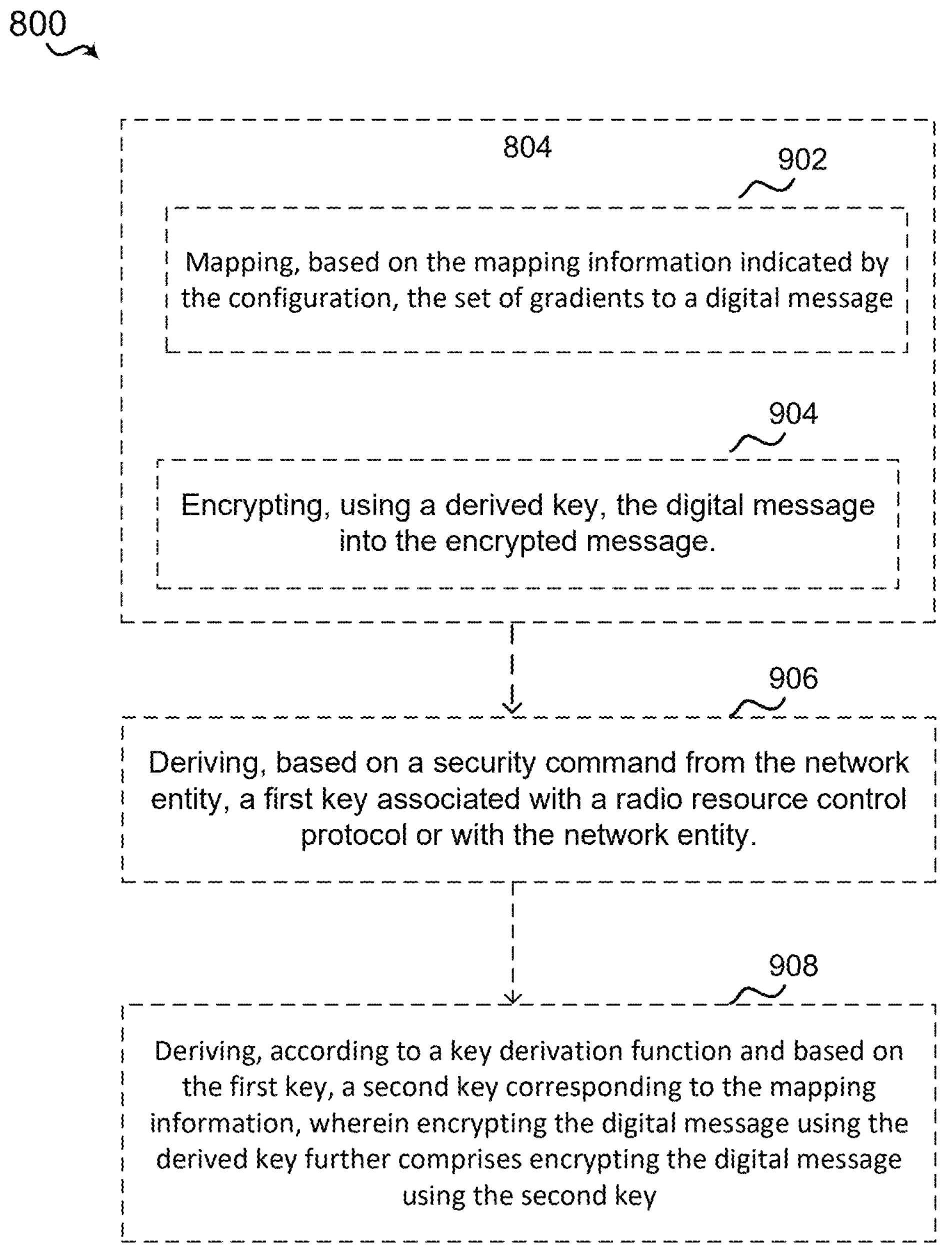
FIG. 9 is a flowchart of a method of wireless communication.

Referring to FIG. 9, in an alternative or additional aspect, at block 902, the generating at block 804 of the signal further includes mapping, based on the mapping information indicated by the configuration, the set of gradients to a digital message. In this optional aspect, at block 904, the generating at block 804 of the signal further includes encrypting, using a derived key, the digital message into the encrypted message.

For example, the mapping and encrypting at block 902 and 904, respectively, may be performed for the reasons as described above. Further, for example, the encrypting, at block 904, may be performed to prevent any illegitimate devices (e.g., BS 612) from determining the set of gradients transmitted by the UE 104 or any local training data of UE 104.

In this optional aspect, at block 906, the method 800 further includes deriving, based on a security command from the network entity (e.g., BS 102/180, BS 602, and the like), a first key associated with a radio resource control protocol or with the network entity (e.g., BS 102/180, BS 602, and the like).

For example, the deriving at block 906 may include deriving the first key based on receiving SecuirtyModeCommand from the network entity (e.g., BS 102/180, BS 602, and the like), and may be performed for the reasons as described above. In some implementations, the first key at block 906 may be a gNB key (e.g., $K_{gNB}$) or an RRC key. Further, for example, the deriving at block 906 may be performed to prevent any illegitimate devices, e.g., BS 612, from snooping in on any transmissions between the network entity (e.g., BS 102/180, BS 602, and the like) and the UE 104, and prevents the secrecy of the key from being comprised.

In this optional aspect, at block 908, the method 800 further includes deriving, according to a key derivation function and based on the first key, a second key corresponding to the mapping information, and wherein encrypting the digital message using the derived key further comprises encrypting the digital message using the second key.

For example, the deriving at block 908 may include providing the first key to the key derivation function as an input, where the second key is the output of the key derivation function. In some implementations, the key derivation function may be a predetermined key derivation function or may indicated to the UE via a message (e.g., an RRC message, an MIB message, and/or the like). Further, for example, the deriving at block 908 may be performed for the reasons as described above.

In this optional aspect, receiving the one or more configurations further includes receiving a random number, and deriving the second key is further based on the random number.

For example, the deriving at block 908 may include providing the random number and the first key to the key derivation function as inputs, where the second key is the output of the key derivation function.

Figure 10:
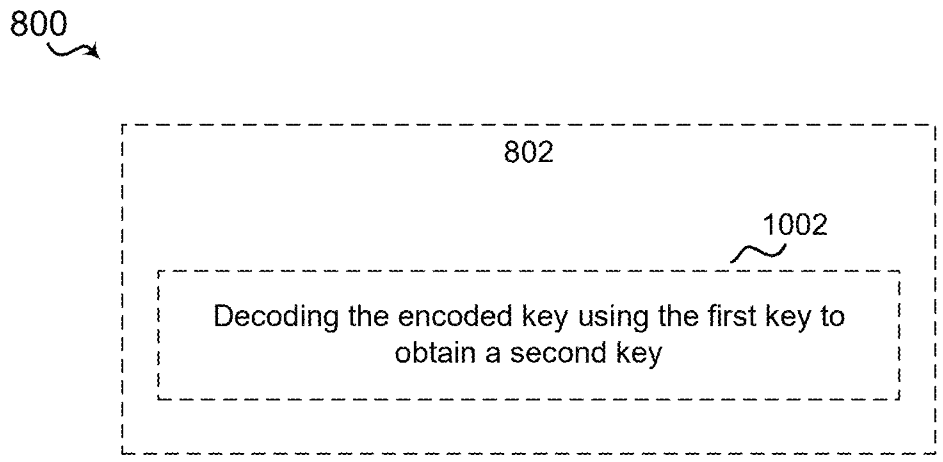
FIG. 10 is a flowchart of a method of wireless communication.

Referring to FIG. 10, in an alternative or additional aspect, at block 1002, the receiving at block 802 of the one or more configurations includes receiving an encoded key, and further comprises decoding the encoded key using the first key to obtain a second key. In this case, encrypting the digital message using the derived key further comprises encrypting the digital message using the second key.

For example, the decoding at block 1002 may include providing as an input the first key to an encoding function used to encode the encoded key or to a decoding function, and the decoding at block 1002 may be performed for the reasons as described above. Further, for example, the decoding at block 1002 prevents any illegitimate devices from determining the second key, and protects the secrecy of the second key.

Figure 11:
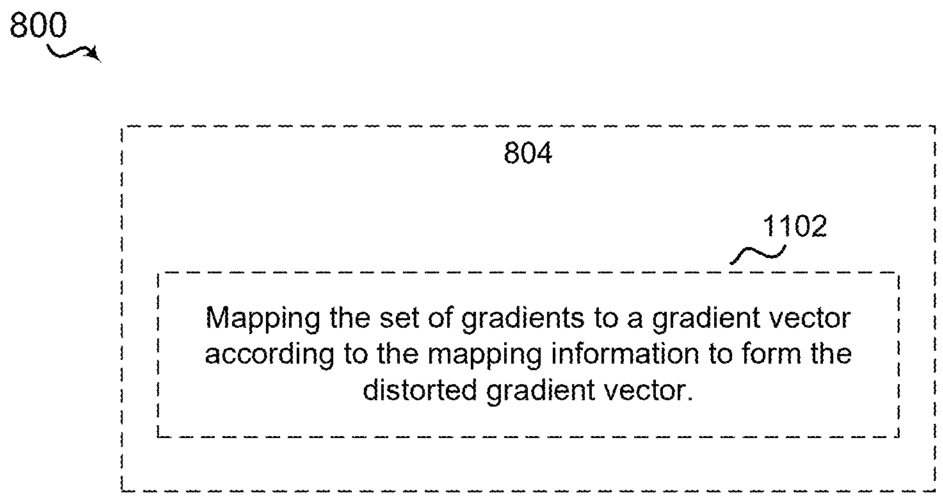
FIG. 11 is a flowchart of a method of wireless communication.

Referring to FIG. 11, in an alternative or additional aspect, at block 1102, the generating at block 804 of the signal further includes mapping the set of gradients to a gradient vector according to the mapping information to form the distorted gradient vector.

For example, the mapping at block 1102 may include encoding the set of gradients using a codebook indicated by the network entity (e.g., BS 102/180, BS 602, and the like) to add noise to the set of gradients according to a noise distribution indicated by the codebook. Further, for example, the mapping at block 1102 may be performed for the reasons as described above.

Figure 12:
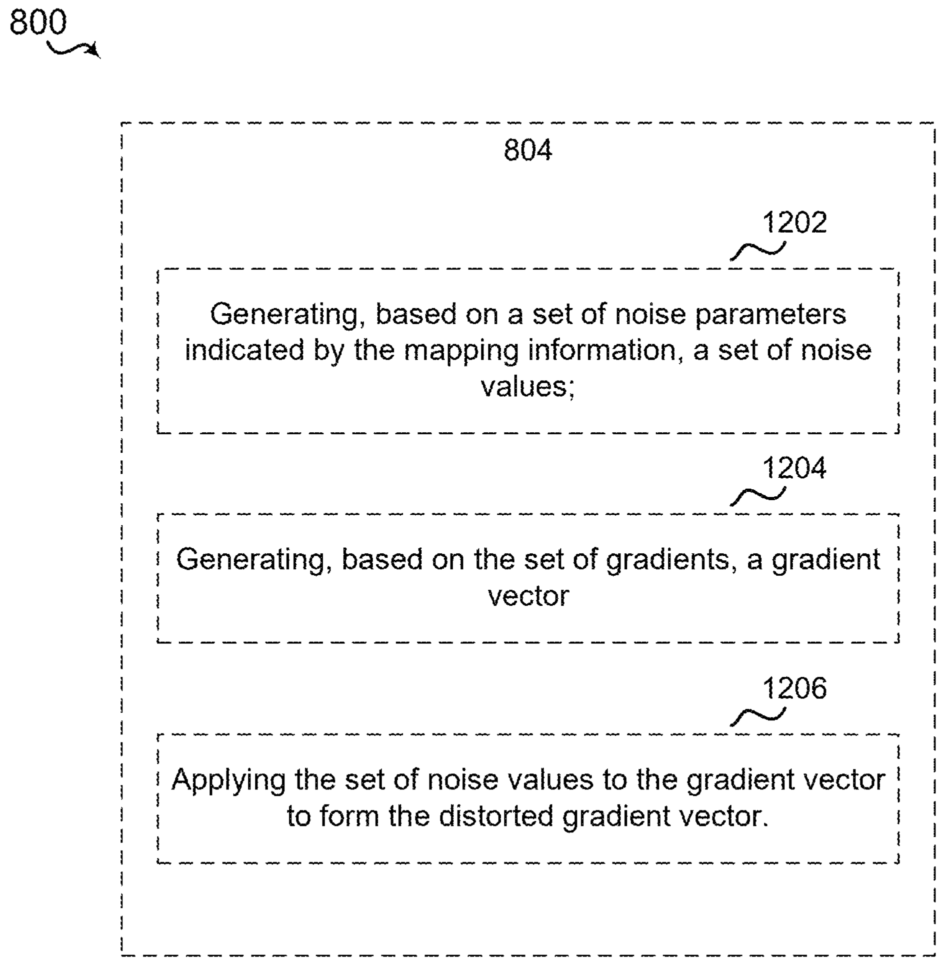
FIG. 12 is a flowchart of a method of wireless communication.

Referring to FIG. 12, in an alternative or additional aspect, at block 1202, the generating at block 804 of the signal further includes generating, based on a set of noise parameters indicated by the mapping information, a set of noise values.

For example, the generating at block 1202 may include generating a noise value indicating an amount of noise for one or more noise parameters of the set of noise parameters, and the generating at block 1202 may be performed for the reasons as described above.

In this optional aspect, at block 1204, the generating at block 804 of the signal further includes generating, based on the set of gradients, a gradient vector.

For example, the gradient vector may include each gradient in the set of gradients, and the generating at block 1204 may be performed for the reasons as described above.

In this optional aspect, at block 1206, the generating at block 804 of the signal further includes applying the set of noise values to the gradient vector to form the distorted gradient vector.

For example, the applying at block 1206 may be performed for the reasons as described above.

Figure 13:
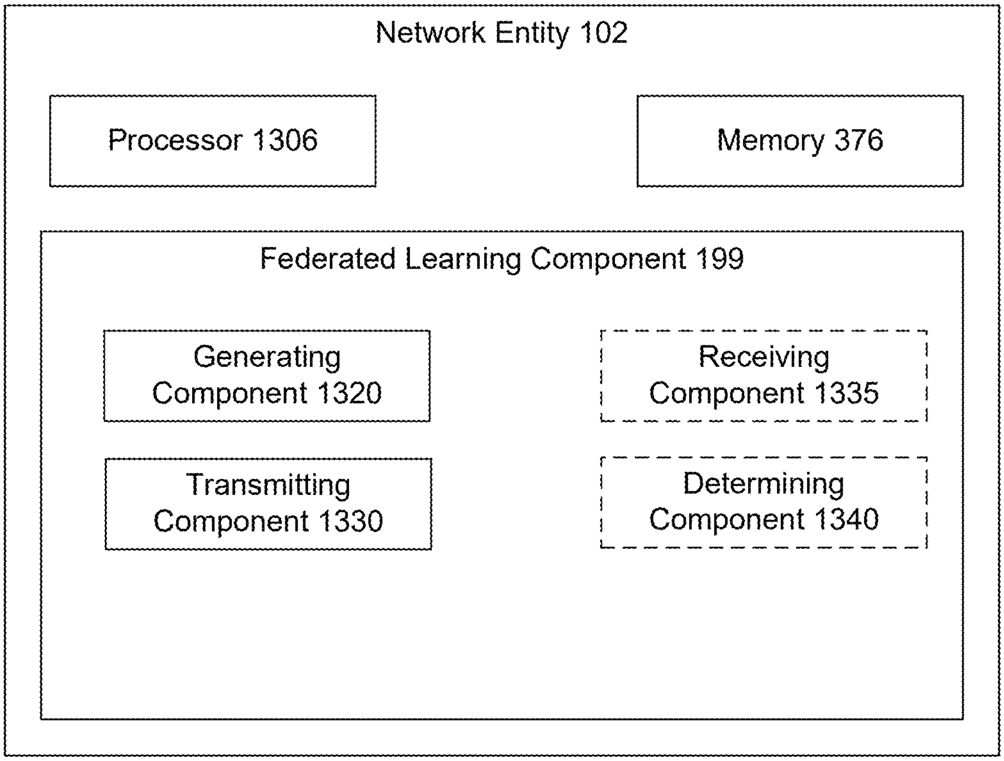
FIG. 13 is a flowchart of a method of wireless communication.
Figure 14:
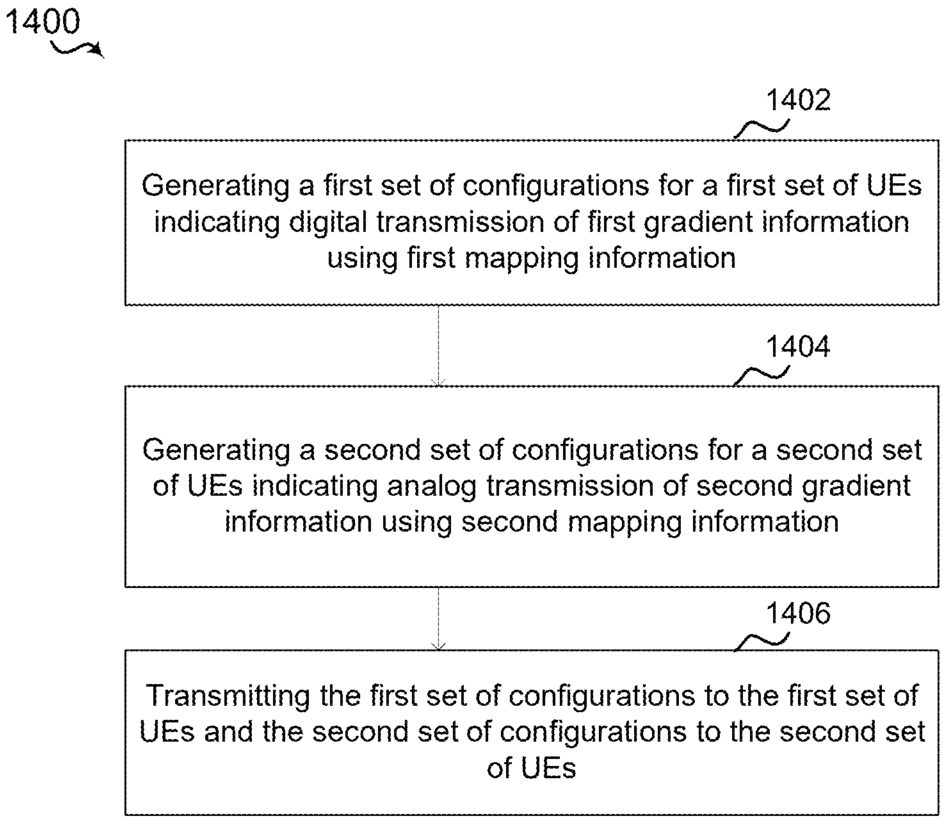
FIG. 14 is a diagram illustrating another example of a hardware implementation for another example apparatus.

Referring to FIG. 13 and FIG. 14, in operation, BS 102 may perform a method 1400 of wireless communication, by such as via execution of federated learning component 199 by processor 1306 and/or memory 376.

At block 1402, the method 1400 includes generating a first set of configurations for a first set of UEs indicating digital transmission of first gradient information first mapping information. For example, in an aspect, BS 102, processor 1306, memory 376, federated learning component 199, and/or generating component 1320 may be configured to or may comprise means for generating a first set of configurations for a first set of UEs indicating transmission of first gradient information using a corresponding set of UE-specific resources and first mapping information.

For example, the generating at block 1402 may include configuring one or more codebooks of different sizes for the first set of UEs.

Further, for example, the generating at block 1402 may be performed for the reasons as described above.

At block 1404, the method 1400 includes generating a second set of configurations for a second set of UEs indicating analog transmission of second gradient information using second mapping information. For example, in an aspect, BS 102, processor 1306, memory 376, federated learning component 199, and/or generating component 1325 may be configured to or may comprise means for generating a second set of configurations for a second set of UEs indicating transmission of second gradient information using a set of common resources and second mapping information.

For example, the generating at block 1404 may include configuring one or more codebooks of different sizes for the second set of UEs.

Further, for example, the generating at block 1404 may be performed for the reasons as described above.

At block 1406, the method 1400 includes transmitting the first set of configurations to the first set of UEs and the second set of configurations to the second set of UEs. For example, in an aspect, BS 102, processor 1306, memory 376, federated learning component 199, and/or transmitting component 1330 may be configured to or may comprise means for transmitting the first set of configurations to the first set of UEs and the second set of configurations to the second set of UEs.

For example, the transmitting at block 1406 may include transmitting the first set of configurations via a wireless signal transmitted using an antenna or an antenna array (e.g., antenna 320) and the second set of configurations via a wireless signal transmitted using an antenna or an antenna array (e.g., antenna 320).

Further, for example, the transmitting at block 1406 may be performed for the reasons as described above.

Figure 15:
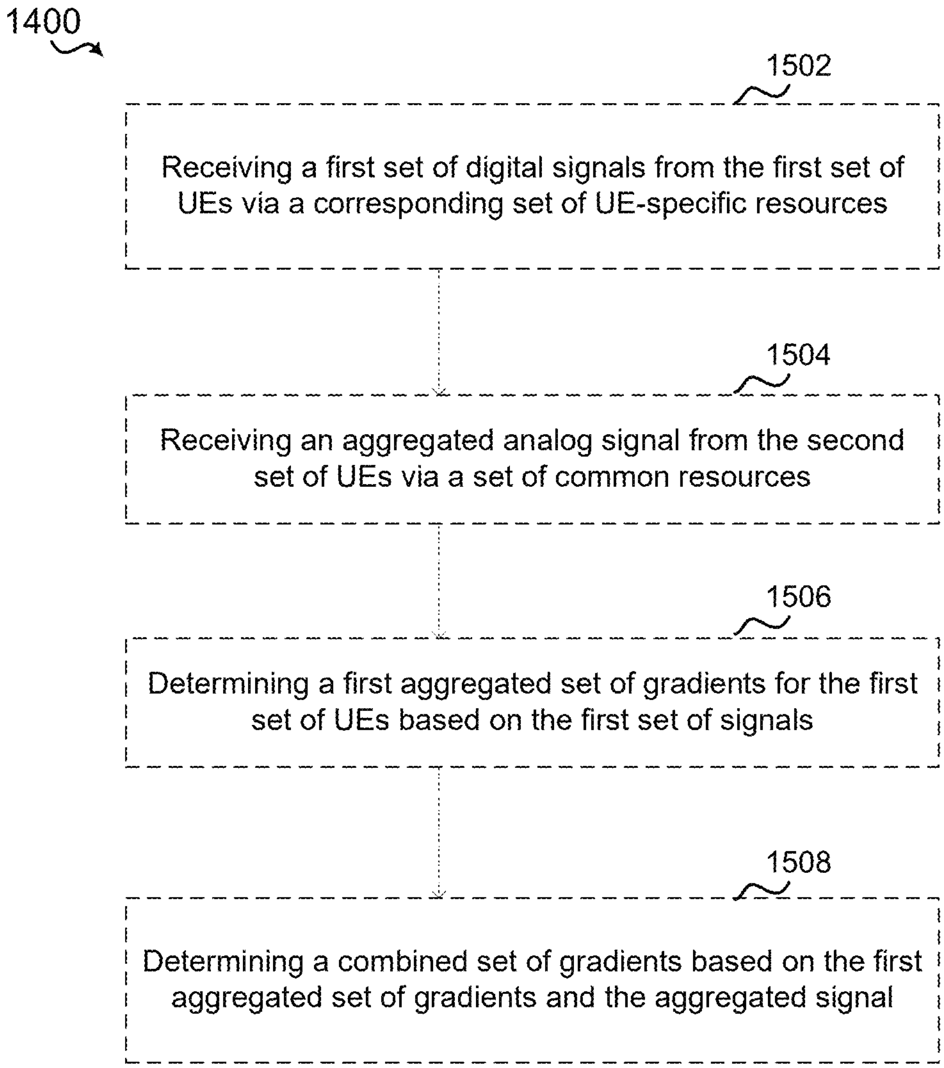
FIG. 15 is a flowchart of a method of wireless communication.

Referring to FIG. 15, in an alternative or additional aspect, at block 1502, the method 1400 may further include receiving a first set of signals from the first set of UEs via the corresponding set of UE-specific resources. For example, in an aspect, BS 102, processor 1306, memory 376, federated learning component 199, and/or receiving component 1335 may be configured to or may comprise means for receiving a first set of signals from the first set of UEs via the corresponding set of UE-specific resources.

For example, the receiving at block 1502 may include receiving the first set of signals via a set of wireless signals at an antenna or an antenna array (e.g., antenna 320) of the BS 102. The set of wireless signals may be digital signals.

Further, for example, the receiving at block 1502 may be performed for the reasons as described above.

In this optional aspect, at block 1504, the method 1400 may further include receiving an aggregated signal from the second set of UEs via the set of common resources. For example, in an aspect, BS 102, processor 1306, memory 376, federated learning component 199, and/or receiving component 1335 may be configured to or may comprise means for receiving an aggregated signal from the second set of UEs via the set of common resources.

For example, the receiving at block 1504 may include receiving the aggregated signal via a wireless signal at an antenna or an antenna array (e.g., antenna 320) of the BS 102. The wireless signal may be an analog signal. The wireless signal may be received over a multiple access channel.

Further, for example, the receiving at block 1504 may be performed for the reasons as described above.

In this optional aspect, at block 1506, the method 1400 may further include determining a first aggregated set of gradients for the first set of UEs based on the first set of signals. For example, in an aspect, BS 102, processor 1306, memory 376, federated learning component 199, and/or determining component 1340 may be configured to or may comprise means for determining a first aggregated set of gradients for the first set of UEs based on the first set of signals.

For example, the determining at block 1506 may be performed for the reasons as described above.

In this optional aspect, at block 1508, the method 1400 may further include determining a combined set of gradients based on the first aggregated set of gradients and the aggregated signal. For example, in an aspect, BS 102, processor 1306, memory 376, federated learning component 199, and/or determining component 1340 may be configured to or may comprise means for determining a combined set of gradients based on the first aggregated set of gradients and the aggregated signal.

For example, the determining at block 1508 may be performed for the reasons as described above.

In an alternative or additional aspect, the aggregated signal includes aggregated quantized gradient information as an aggregated distorted gradient vector based on sets of gradients of the second set of UEs distorted according to the second mapping information.

In an alternative or additional aspect, a signal in the first set of signals includes quantized gradient information of a UE in the first set of UEs in an encrypted message having a set of gradients of the UE encrypted based on the first mapping information. In this aspect, the first set of configurations indicate a security command configured to cause each UE to derive a first key associated with a radio resource control protocol or with the network entity (e.g., BS 102/180, BS 602, and the like).

Figure 16:
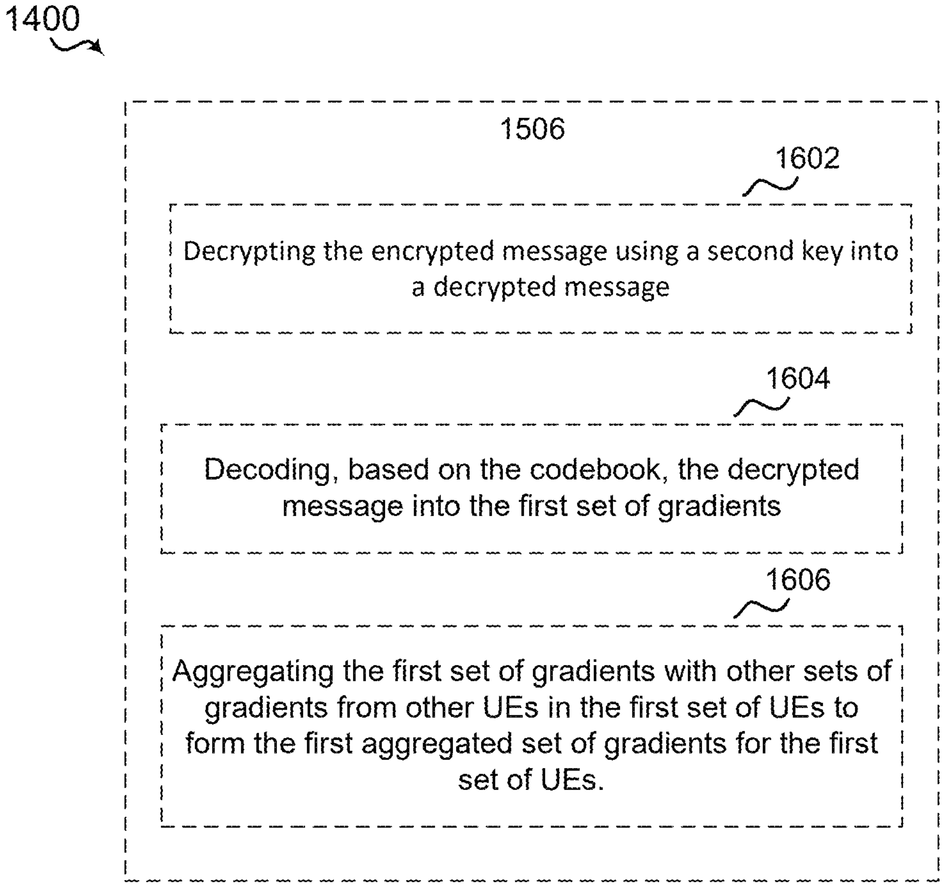
FIG. 16 is a flowchart of a method of wireless communication.

Referring to FIG. 16, in an alternative or additional aspect wherein the first mapping information indicates a codebook for the UE, at block 1602, the determining at block 1506 of the first aggregated set of gradients further includes decrypting the encrypted message using a second key into a decrypted message.

For example, the determining at block 1602 may be performed for the reasons as described above.

In this optional aspect, at block 1604, the determining at block 1506 of the first aggregated set of gradients further includes decoding, based on the codebook, the decrypted message into the first set of gradients.

For example, the decoding, at block 1604, may be performed for the reasons as described above.

In this optional aspect, at block 1606, the determining at block 1506 of the first aggregated set of gradients further includes aggregating the first set of gradients with other sets of gradients from other UEs in the first set of UEs to form the first aggregated set of gradients for the first set of UEs.

For example, the determining, at block 1606, may be performed for the reasons as described above.

In an alternative or additional aspect, the second key is determined based on the first key and a random number for the UE.

In an alternative or additional aspect, the first set of configurations indicate an encoded key for the UE, and wherein the second key is determined based on the first key and the encoded key.

In an alternative or additional aspect, the second set of configurations indicates the second mapping information, wherein the second mapping information includes at least one of a codebook configured for a UE in the second set of UEs or a set of noise parameters to distort a set of gradients of the UE in the second set of UEs, wherein the codebook is configured to distort values of the set of gradients of the UE.

Figure 17:
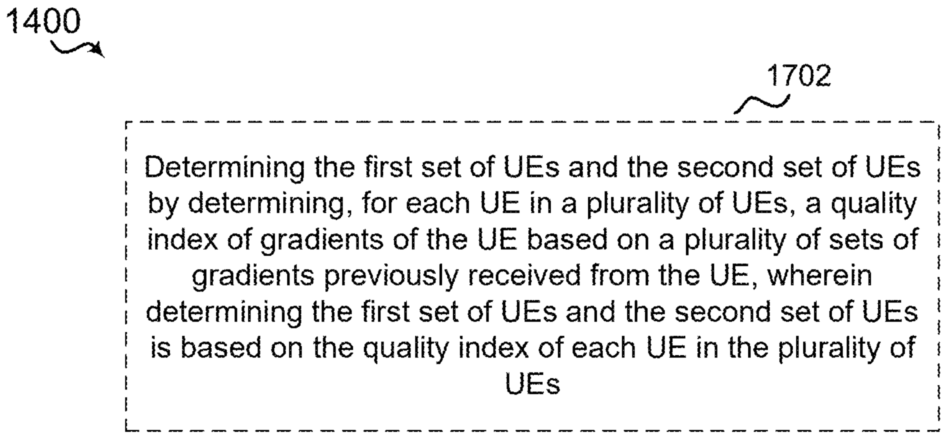
FIG. 17 is a flowchart of a method of wireless communication.

Referring to FIG. 17, in an alternative or additional aspect, at block 1702, the method 1400 may further include determining the first set of UEs and the second set of UEs by determining, for each UE in a plurality of UEs, a quality index of gradients of the UE based on a plurality of sets of gradients previously received from the UE, wherein determining the first set of UEs and the second set of UEs is based on the quality index of each UE in the plurality of UEs. For example, in an aspect, BS 102, processor 1306, memory 376, federated learning component 199, and/or determining component 1340 may be configured to or may comprise means for determining the first set of UEs and the second set of UEs by determining, for each UE in a plurality of UEs, a quality index of gradients of the UE based on a plurality of sets of gradients previously received from the UE, wherein determining the first set of UEs and the second set of UEs is based on the quality index of each UE in the plurality of UEs.

For example, the determining at block 1702 may be performed for the reasons as described above.

In an alternative or additional aspect, the quality index of each UE in the first set of UEs satisfies a threshold quality index, and wherein the quality index of each UE in the second set of UEs fails to satisfy the threshold quality index.

In an alternative or additional aspect, at least one UE in the first set of UEs is from a previously determined second set of UEs.

The techniques described above allow for federated learning to be securely implemented across a BS and a set of UEs (e.g., UEs served by the BS) without using significant number of orthogonal time/frequency resources and without comprising local training data of the UEs in the set of UEs.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

1. A method of wireless communication at a user equipment (UE), comprising:

receiving one or more configurations indicating transmission of gradient information using mapping information and a transmission type, wherein the transmission type indicates an analog transmission or a digital transmission of the gradient information and the gradient information is associated with training a global machine learning model;

generating a signal including quantized gradient information based on the mapping information and a set of gradients, wherein the set of gradients is associated with the training of the global machine learning model with local training data at the UE; and transmitting the signal to a network entity via the analog transmission or the digital transmission based on the transmission type.

2. The method of clause 1, wherein the transmission type indicates the digital transmission, and wherein transmitting the signal includes transmitting the signal via the digital transmission using a set of UE-specific resources, and wherein the signal includes the quantized gradient information in an encrypted message having the set of gradients encrypted based on the mapping information.

3. The method of any of the preceding clauses, wherein the transmission type indicates the analog transmission, and wherein transmitting the signal includes transmitting the signal via the analog transmission using a set of common resources, and wherein the signal includes the quantized gradient information as a distorted gradient vector based on the set of gradients distorted according to the mapping information.

4. The method of any of the preceding clauses, wherein the mapping information comprises a set of parameters of noise distribution to apply to a gradient vector associated with the set of gradients.

5. The method of any of the preceding clauses, wherein receiving the one or more configurations includes receiving an indication of the mapping information in downlink control information, in a protocol layer control element, in a radio resource control signaling message, or in slot-based usage information.

6. The method of any of the preceding clauses, wherein the mapping information indicates at least one of a plurality of codebooks each having different encoding characteristics.

7. The method of any of the preceding clauses, wherein generating the signal further comprises:

mapping, based on the mapping information indicated by the configuration, the set of gradients to a digital message; and encrypting, using a derived key, the digital message into the encrypted message.

8. The method of any of the preceding clauses, further comprising:

deriving, based on a security command from the network entity, a first key associated with a radio resource control protocol or with the network entity.

9. The method of any of the preceding clauses, further comprising:

deriving, according to a key derivation function and based on the first key, a second key corresponding to the mapping information; and wherein encrypting the digital message using the derived key further comprises encrypting the digital message using the second key.

10. The method of any of the preceding clauses, wherein receiving the one or more configurations further includes receiving a random number, and wherein deriving the second key is further based on the random number.

11. The method of any of the preceding clauses, wherein receiving the one or more configurations includes receiving an encoded key, and further comprising:

decoding the encoded key using the first key to obtain a second key; and wherein encrypting the digital message using the derived key further comprises encrypting the digital message using the second key.

12. The method of any of the preceding clauses, wherein generating the signal further comprises:

mapping the set of gradients to a gradient vector according to the mapping information to form the distorted gradient vector.

13. The method of any of the preceding clauses, wherein generating the signal further comprises:

generating, based on a set of noise parameters indicated by the mapping information, a set of noise values;

generating, based on the set of gradients, a gradient vector; and applying the set of noise values to the gradient vector to form the distorted gradient vector.

14. An apparatus for wireless communication at a user equipment (UE), comprising:

a memory; and a processor coupled with the memory and configured to:

receive one or more configurations indicating transmission of gradient information using mapping information and a transmission type, wherein the transmission type indicates an analog transmission or a digital transmission of the gradient information and the gradient information is associated with training a global machine learning model;

generate a signal including quantized gradient information based on the mapping information and a set of gradients, wherein the set of gradients is associated with the training of the global machine learning model with local training data at the UE; and transmit the signal to a network entity via the analog transmission or the digital transmission based on the transmission type.

15. The apparatus of clause 14, wherein the transmission type indicates the digital transmission, and wherein to transmit the signal includes to transmit the signal via the digital transmission using a set of UE-specific resources, and wherein the signal includes the quantized gradient information in an encrypted message having the set of gradients encrypted based on the mapping information.

16. The apparatus of any of the preceding clauses, wherein the transmission type indicates the digital transmission, and wherein to transmit the signal includes to transmit the signal via the analog transmission using a set of common resources, and wherein the signal includes the quantized gradient information as a distorted gradient vector based on the set of gradients distorted according to the map information.

17. The apparatus of any of the preceding clauses, wherein the mapping information comprises a set of parameters of noise distribution to apply to a gradient vector associated with the set of gradients.

18. The apparatus of any of the preceding clauses, wherein to receive the one or more configurations includes to receive an indication of the mapping information in downlink control information, in a protocol layer control element, in a radio resource control signaling message, or in slot-based usage information.

19. The apparatus of any of the preceding clauses, wherein the mapping information indicates at least one of a plurality of codebooks each having different encoding characteristics.

20. The apparatus of any of the preceding clauses, wherein to generate the signal the processor is further configured to:

mapping, based on the mapping information indicated by the configuration, the set of gradients to a digital message; and encrypt, using a derived key, the digital message into the encrypted message.

21. The apparatus of any of the preceding clauses, wherein the processor is further configured to:

derive, based on a security command from the network entity, a first key associated with a radio resource control protocol or with the network entity.

22. The apparatus of any of the preceding clauses, wherein the processor is further configured to:

derive, according to a key derivation function and based on the first key, a second key corresponding to the map information; and wherein to encrypt the digital message using the derived key the processor is further configured to encrypt the digital message using the second key.

23. The apparatus of any of the preceding clauses, wherein to receive the one or more configurations further includes receiving a random number, and wherein to derive the second key is further based on the random number.

24. The apparatus of any of the preceding clauses, wherein to receive the one or more configurations includes to receive an encoded key, and wherein the processor is further configured to:

decode the encoded key using the first key to obtain a second key; and wherein to encrypt the digital message using the derived key the processor is further configured to encrypt the digital message using the second key.

25. The apparatus of any of the preceding clauses, wherein to generate the signal the processor is further configured to:

map the set of gradients to a gradient vector according to the map information to form the distorted gradient vector.

26. The apparatus of any of the preceding clauses, wherein to generate the signal the processor is further configured to:

generate, based on a set of noise parameters indicated by the mapping information, a set of noise values;

generate, based on the set of gradients, a gradient vector; and apply the set of noise values to the gradient vector to form the distorted gradient vector.

27. A method of wireless communication at a network entity, comprising:

generating a first set of configurations for a first set of user equipments (UEs) indicating digital transmission of first gradient information using first mapping information;

generating a second set of configurations for a second set of UEs indicating analog transmission of second gradient information using second mapping information; and transmitting the first set of configurations to the first set of UEs and the second set of configurations to the second set of UEs.

28. The method of clause 27, further comprising:

receiving a first set of digital signals from the first set of UEs via the corresponding set of UE-specific resources;

receiving an aggregated analog signal from the second set of UEs via the set of common resources;

determining a first aggregated set of gradients for the first set of UEs based on the first set of signals; and determining a combined set of gradients based on the first aggregated set of gradients and the aggregated signal.

29. The method of any of the preceding clauses, wherein the aggregated analog signal includes aggregated quantized gradient information as an aggregated distorted gradient vector based on sets of gradients of the second set of UEs distorted according to the second mapping information.

30. The method of any of the preceding clauses, wherein a signal in the first set of digital signals includes quantized gradient information of a UE in the first set of UEs in an encrypted message having a set of gradients of the UE encrypted based on the first mapping information.

31. The method of any of the preceding clauses, wherein the first set of configurations indicate a security command configured to cause each UE to derive a first key associated with a radio resource control protocol or with the network entity.

32. The method of any of the preceding clauses, wherein the first mapping information indicates a codebook for the UE, and wherein the determining the first aggregated set of gradients further comprises:

decrypting the encrypted message using a second key into a decrypted message; decoding, based on the codebook, the decrypted message into the first set of gradients; and aggregating the first set of gradients with other sets of gradients from other UEs in the first set of UEs to form the first aggregated set of gradients for the first set of UEs.

33. The method of any of the preceding clauses, wherein the second key is determined based on the first key and a random number for the UE.

34. The method of any of the preceding clauses, wherein the first set of configurations indicate an encoded key for the UE, and wherein the second key is determined based on the first key and the encoded key.

35. The method of any of the preceding clauses, wherein the second set of configurations indicates the second mapping information, wherein the second mapping information includes at least one of a codebook configured for a UE in the second set of UEs or a set of noise parameters to distort a set of gradients of the UE in the second set of UEs, wherein the codebook is configured to distort values of the set of gradients of the UE.

36. The method of any of the preceding clauses, further comprising:

determining the first set of UEs and the second set of UEs by determining, for each UE in a plurality of UEs, a quality index of gradients of the UE based on a plurality sets of gradients previously received from the UE, wherein determining the first set of UEs and the second set of UEs is based on the quality index of each UE in the plurality of UEs.

37. The method of any of the preceding clauses, wherein the quality index of each UE in the first set of UEs satisfies a threshold quality index, and wherein the quality index of each UE in the second set of UEs fails to satisfy the threshold quality index.

38. The method of any of the preceding clauses, wherein at least one UE in the first set of UEs is from a previously determined second set of UEs.

39. An apparatus for wireless communication at a network entity, comprising:

a memory; and a processor coupled with the memory and configured to:

generate a first set of configurations for a first set of user equipments (UEs) indicating digital transmission of first gradient information using first mapping information;

generate a second set of configurations for a second set of UEs indicating analog transmission of second gradient information using second mapping information; and transmit the first set of configurations to the first set of UEs and the second set of configurations to the second set of UEs.

40. The apparatus of clause 39, wherein the processor is further configured to:

receive a first set of digital signals from the first set of UEs via a corresponding set of UE-specific resources;

receive an aggregated analog signal from the second set of UEs via a set of common resources;

determine a first aggregated set of gradients for the first set of UEs based on the first set of signals; and determine a combined set of gradients based on the first aggregated set of gradients and the aggregated signal.

41. The apparatus of any of the preceding clauses, wherein the aggregated analog signal includes aggregated quantized gradient information as an aggregated distorted gradient vector based on sets of gradients of the second set of UEs distorted according to the second mapping information.

42. The apparatus of any of the preceding clauses, wherein a signal in the first set of digital signals includes quantized gradient information of a UE in the first set of UEs in an encrypted message having a set of gradients of the UE encrypted based on the first mapping information.

43. The apparatus of any of the preceding clauses, wherein the first set of configurations indicate a security command configured to cause each UE to derive a first key associated with a radio resource control protocol or with the network entity.

44. The apparatus of clause 43, wherein the first mapping information indicates a codebook for the UE, and wherein the determining the first aggregated set of gradients the processor is further configured to:

decrypting the encrypted message using a second key into a decrypted message;

decode, based on the codebook, the decrypted message into the first set of gradients; and aggregate the first set of gradients with other sets of gradients from other UEs in the first set of UEs to form the first aggregated set of gradients for the first set of UEs.

45. The apparatus of any of the preceding clauses, wherein the second key is determined based on the first key and a random number for the UE.

46. The apparatus of any of the preceding clauses, wherein the first set of configurations indicate an encoded key for the UE, and wherein the second key is determined based on the first key and the encoded key.

47. The apparatus of any of the preceding clauses, wherein the second set of configurations indicates the second mapping information, wherein the second mapping information includes at least one of a codebook configured for a UE in the second set of UEs or a set of noise parameters to distort a set of gradients of the UE in the second set of UEs, wherein the codebook is configured to distort values of the set of gradients of the UE.

48. The apparatus of any of the preceding clauses, wherein the processor is further configured to:

determine the first set of UEs and the second set of UEs by determining, for each UE in a plurality of UEs, a quality index of gradients of the UE based on a plurality of sets of gradients previously received from the UE, wherein determining the first set of UEs and the second set of UEs is based on the quality index of each UE in the plurality of UEs.

49. The apparatus of any of the preceding clauses, wherein the quality index of each UE in the first set of UEs satisfies a threshold quality index, and wherein the quality index of each UE in the second set of UEs fails to satisfy the threshold quality index.

50. The apparatus of any of the preceding clauses, wherein at least one UE in the first set of UEs is from a previously determined second set of UEs.

51. An apparatus for wireless communication, comprising one or more means for performing the method of clauses 1-13.

52. A computer-readable medium comprising stored instructions for wireless communication, executable by a processor to perform the method of any of the clauses 1-13.

53. An apparatus for wireless communication, comprising one or more means for performing the method of clauses 14-26.

54. A computer-readable medium comprising stored instructions for wireless communication, executable by a processor to perform the method of any of the clauses 14-26.

What is claimed is:

1. A method of wireless communication at a user equipment (UE), comprising:

receiving one or more configurations indicating transmission of gradient information using mapping information and a transmission type, wherein the transmission type indicates an analog transmission or a digital transmission of the gradient information and the gradient information is associated with training a global machine learning model;

generating a signal including quantized gradient information based on the mapping information and a set of gradients, wherein the set of gradients is associated with the training of the global machine learning model with local training data at the UE; and transmitting the signal to a network entity via the analog transmission or the digital transmission based on the transmission type;

wherein, for the digital transmission, transmitting the signal includes transmitting the signal via the digital transmission using a set of UE-specific resources, and wherein the signal includes the quantized gradient information in an encrypted message having the set of gradients encrypted based on the mapping information; and wherein, for the analog transmission, transmitting the signal includes transmitting the signal via the analog transmission using a set of common resources, and wherein the signal includes the quantized gradient information as a distorted gradient vector based on the set of gradients distorted according to the mapping information.

2. The method of claim 1, wherein the mapping information comprises a set of parameters of noise distribution to apply to a gradient vector associated with the set of gradients.

3. The method of claim 1, wherein generating the signal further comprises:

mapping, based on the mapping information indicated by the configuration, the set of gradients to a digital message; and encrypting, using a derived key, the digital message into the encrypted message.

4. The method of claim 3, further comprising:
deriving, based on a security command from the network entity, a first key associated with a radio resource control protocol or with the network entity.

5. The method of claim 4, further comprising:
deriving, according to a key derivation function and based on the first key, a second key corresponding to the mapping information, or
deriving the second key according to the key derivation function and based on the first key and a random number received via the one or more configurations; and
wherein encrypting the digital message using the derived key further comprises encrypting the digital message using the second key.

6. The method of claim 4, wherein receiving the one or more configurations includes receiving an encoded key, and further comprising:
decoding the encoded key using the first key to obtain a second key; and
wherein encrypting the digital message using the derived key further comprises encrypting the digital message using the second key.

7. The method of claim 1, wherein generating the signal further comprises:
mapping the set of gradients to a gradient vector according to the mapping information to form the distorted gradient vector; or
generating, based on a set of noise parameters indicated by the mapping information, a set of noise values, and applying the set of noise values to the gradient vector to form the distorted gradient vector.

8. An apparatus for wireless communication at a user equipment (UE), comprising:
memory; and
a processor coupled with the memory and configured to:
receive one or more configurations indicating transmission of gradient information using mapping information and a transmission type, wherein the transmission type indicates an analog transmission or a digital transmission of the gradient information and the gradient information is associated with training a global machine learning model;
generate a signal including quantized gradient information based on the mapping information and a set of gradients, wherein the set of gradients is associated with the training of the global machine learning model with local training data at the UE; and
transmit the signal to a network entity via the analog transmission or the digital transmission based on the transmission type;
wherein, for the digital transmission, to transmit the signal includes to transmit the signal via the digital transmission using a set of UE-specific resources, and wherein the signal includes the quantized gradient information in an encrypted message having the set of gradients encrypted based on the mapping information; and
wherein, for the analog transmission, to transmit the signal includes to transmit the signal via the analog transmission using a set of common resources, and wherein the signal includes the quantized gradient information as a distorted gradient vector based on the set of gradients distorted according to the mapping information.

9. The apparatus of claim 8, wherein the mapping information comprises a set of parameters of noise distribution to apply to a gradient vector associated with the set of gradients.

10. The apparatus of claim 8, wherein to generate the signal the processor is further configured to:
mapping, based on the mapping information indicated by the configuration, the set of gradients to a digital message; and
encrypt, using a derived key, the digital message into the encrypted message.

11. The apparatus of claim 10, wherein the processor is further configured to:
derive, based on a security command from the network entity, a first key associated with a radio resource control protocol or with the network entity.

12. The apparatus of claim 11, wherein the processor is further configured to:
derive, according to a key derivation function and based on the first key, a second key corresponding to the map information; and
wherein to encrypt the digital message using the derived key the processor is further configured to encrypt the digital message using the second key.

13. The apparatus of claim 12,
wherein to receive the one or more configurations further includes receiving a random number, and
wherein to derive the second key is further based on the random number.

14. The apparatus of claim 11, wherein to receive the one or more configurations includes to receive an encoded key, and wherein the processor is further configured to:
decode the encoded key using the first key to obtain a second key; and
wherein to encrypt the digital message using the derived key the processor is further configured to encrypt the digital message using the second key.

15. The apparatus of claim 8, wherein to generate the signal the processor is further configured to:
map the set of gradients to a gradient vector according to the map information to form the distorted gradient vector.

16. The apparatus of claim 8, wherein to generate the signal the processor is further configured to:
generate, based on a set of noise parameters indicated by the mapping information, a set of noise values;
generate, based on the set of gradients, a gradient vector; and
apply the set of noise values to the gradient vector to form the distorted gradient vector.

17. An apparatus for wireless communication at a network entity, comprising:
memory; and
a processor coupled with the memory and configured to:
generate a first set of configurations for a first set of user equipments (UEs) indicating digital transmission of first gradient information using first mapping information;
generate a second set of configurations for a second set of UEs indicating analog transmission of second gradient information using second mapping information; and
transmit the first set of configurations to the first set of UEs and the second set of configurations to the second set of UEs;

wherein the processor is further configured to:

receive a first set of digital signals from the first set of UEs via a corresponding set of UE-specific resources;

receive an aggregated analog signal from the second set of UEs via a set of common resources;

determine a first aggregated set of gradients for the first set of UEs based on the first set of signals; and determine a combined set of gradients based on the first aggregated set of gradients and the aggregated analog signal.

18. The apparatus of claim 17, wherein the aggregated analog signal includes aggregated quantized gradient information as an aggregated distorted gradient vector based on sets of gradients of the second set of UEs distorted according to the second mapping information, or wherein a signal in the first set of digital signals includes quantized gradient information of a UE in the first set of UEs in an encrypted message having a set of gradients of the UE encrypted based on the first mapping information.

19. The apparatus of claim 18, wherein the first set of configurations indicate a security command configured to cause each UE to derive a first key associated with a radio resource control protocol or with the network entity.

20. The apparatus of claim 19, wherein the first mapping information indicates a codebook for the UE, and wherein the determining the first aggregated set of gradients the processor is further configured to:

decrypting the encrypted message using a second key into a decrypted message;

decode, based on the codebook, the decrypted message into the first set of gradients; and aggregate the first set of gradients with other sets of gradients from other UEs in the first set of UEs to form the first aggregated set of gradients for the first set of UEs.

21. The apparatus of claim 20, wherein the second key is determined based on the first key and a random number for the UE.

22. The apparatus of claim 20, wherein the first set of configurations indicate an encoded key for the UE, and wherein the second key is determined based on the first key and the encoded key.

23. The apparatus of claim 17, wherein the second set of configurations indicates the second mapping information, wherein the second mapping information includes at least one of a codebook configured for a UE in the second set of UEs or a set of noise parameters to distort a set of gradients of the UE in the second set of UEs, wherein the codebook is configured to distort values of the set of gradients of the UE.

24. The apparatus of claim 17, wherein the processor is further configured to:

determine the first set of UEs and the second set of UEs by determining, for each UE in a plurality of UEs, a quality index of gradients of the UE based on a plurality of sets of gradients previously received from the UE, wherein determining the first set of UEs and the second set of UEs is based on the quality index of each UE in the plurality of UEs.

* * * * *